(12) United States Patent
Shen et al.

(10) Patent No.: US 11,889,180 B2
(45) Date of Patent: Jan. 30, 2024

(54) PHOTOGRAPHING METHOD AND ELECTRONIC DEVICE

(71) Applicant: Huawei Technologies Co., Ltd., Shenzhen (CN)

(72) Inventors: Tao Shen, Shanghai (CN); Jun Wang, Shanghai (CN); Yang Li, Moscow (RU); Yanpeng Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 230 days.

(21) Appl. No.: 17/420,939

(22) PCT Filed: Dec. 13, 2019

(86) PCT No.: PCT/CN2019/125067
§ 371 (c)(1),
(2) Date: Jul. 6, 2021

(87) PCT Pub. No.: WO2020/140726
PCT Pub. Date: Jul. 9, 2020

(65) Prior Publication Data
US 2022/0094858 A1 Mar. 24, 2022

(30) Foreign Application Priority Data
Jan. 3, 2019 (CN) .......................... 201910005608.6

(51) Int. Cl.
*H04N 23/63* (2023.01)
*G06V 10/74* (2022.01)
*H04N 23/611* (2023.01)

(52) U.S. Cl.
CPC ......... *H04N 23/632* (2023.01); *G06V 10/761* (2022.01); *H04N 23/611* (2023.01)

(58) Field of Classification Search
CPC .............. G06T 7/73; G06T 7/33; G06T 7/246
See application file for complete search history.

(56) References Cited

U.S. PATENT DOCUMENTS 7,526,191 B2  4/2009 Lin et al.
8,988,529 B2  3/2015 Kokubun
(Continued)

FOREIGN PATENT DOCUMENTS

CN  101090485 A  12/2007
CN  101561928 A  10/2009
(Continued)

OTHER PUBLICATIONS

Rasheed, Z. and Shah, M., Jun. 2003, Scene detection in Hollywood movies and TV shows. In 2003 IEEE Computer Society Conference on Computer Vision and Pattern Recognition, 2003. Proceedings. (vol. 2, pp. II-343). IEEE. (Year: 2003).*

(Continued)

*Primary Examiner* — Clifford Hilaire
(74) *Attorney, Agent, or Firm* — Leydig, Voit & Mayer, Ltd.

(57) ABSTRACT

A photographing method and an electronic device are provided, so that a to-be-photographed target can continue to be tracked after the to-be-photographed target returns to a shooting image, to improve accuracy of focusing performed during photographing of a moving object. The method includes: displaying a first image including a first object and a tracking indicator that is associated with the first object, the tracking indicator indicating that the first object is a tracked target; displaying a second image that does not include the first object or the tracking indicator; displaying a third image including the first object; automatically setting the first object as the tracked target and displaying the tracking indicator associated with the first object; and automatically focusing on the first object when displaying the third image.

20 Claims, 20 Drawing Sheets

(56) References Cited

U.S. PATENT DOCUMENTS

| | | | |
|---|---|---|---|
| 9,591,208 B2 | 3/2017 | Huang et al. | |
| 9,734,587 B2 | 8/2017 | Sun et al. | |
| 10,042,031 B2 | 8/2018 | Kumar et al. | |
| 2008/0002857 A1 | 1/2008 | Tsunashima | |
| 2008/0187173 A1 | 8/2008 | Kim et al. | |
| 2009/0087099 A1 | 4/2009 | Nakamura | |
| 2009/0141940 A1* | 6/2009 | Zhao | G06T 7/248 382/103 |
| 2009/0304234 A1* | 12/2009 | Kondo | G06T 7/248 382/103 |
| 2010/0020222 A1 | 1/2010 | Jones et al. | |
| 2010/0098397 A1 | 4/2010 | Yata | |
| 2011/0019066 A1 | 1/2011 | Takano et al. | |
| 2011/0221890 A1 | 9/2011 | Yamashita | |
| 2011/0293139 A1 | 12/2011 | Ohta | |
| 2013/0002885 A1 | 1/2013 | Fukui | |
| 2013/0088621 A1 | 4/2013 | Hamada | |
| 2015/0248586 A1 | 9/2015 | Gaidon et al. | |
| 2017/0278245 A1* | 9/2017 | Anastassacos | G06V 20/36 |
| 2018/0217223 A1 | 8/2018 | Kumar et al. | |
| 2018/0322641 A1* | 11/2018 | Ueda | G06T 7/248 |
| 2018/0352144 A1* | 12/2018 | Miao | G06F 18/241 |
| 2018/0374233 A1* | 12/2018 | Zhou | G06F 18/22 |
| 2021/0174652 A1* | 6/2021 | Hirasawa | G08B 13/1968 |

FOREIGN PATENT DOCUMENTS

| | | | |
|---|---|---|---|
| CN | 101662587 A | 3/2010 | |
| CN | 101853511 A | 10/2010 | |
| CN | 102387345 A | 3/2012 | |
| CN | 103426183 A | 12/2013 | |
| CN | 103839255 A | 6/2014 | |
| CN | 105759839 A | 7/2016 | |
| CN | 107037962 A | 8/2017 | |
| CN | 109831622 A | 5/2019 | |
| EP | 1737216 B1 | 5/2009 | |
| JP | 2013118712 A | 6/2013 | |
| KR | 101293245 B1 | 8/2013 | |
| RU | 2599177 C2 | 10/2016 | |
| WO | 2017084295 A1 | 5/2017 | |

OTHER PUBLICATIONS

D. G. Lowe, "Object recognition from local scale-invariant features," Proceedings of the Seventh IEEE International Conference on Computer Vision, Kerkyra, Greece, 1999, pp. 1150-1157 vol. 2, doi: 10.1109/ICCV.1999.790410 (Year: 1999).*

Huanlong et al., "Video Object Tracking Based on Appearance Models Learning," Journal of Computer Research and Development, total 14 pages (2015). With an English abstract.

Zhang, "Sony a6500: A Flagship APS-C Camera with Fastest AF and Most AF Points," https://petapixel.com/2016/10/06/sony-a6500-flagship-aps-c-camera-fastest-af-af-points, total 6 pages (Oct. 6, 2016).

Humrick et al., "Samsung Galaxy S6 And S6 Edge Review," https://www.tomshardware.com/reviews/samsung-galaxy-s6-s6-edge,4157-5.html, total 10 pages (Jul. 6, 2015).

* cited by examiner

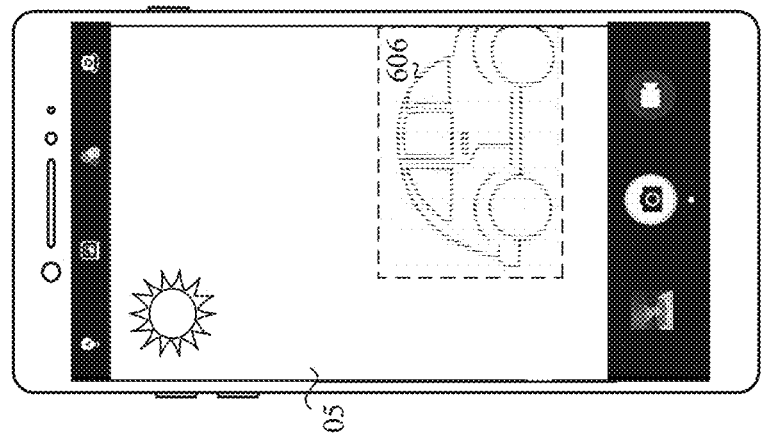
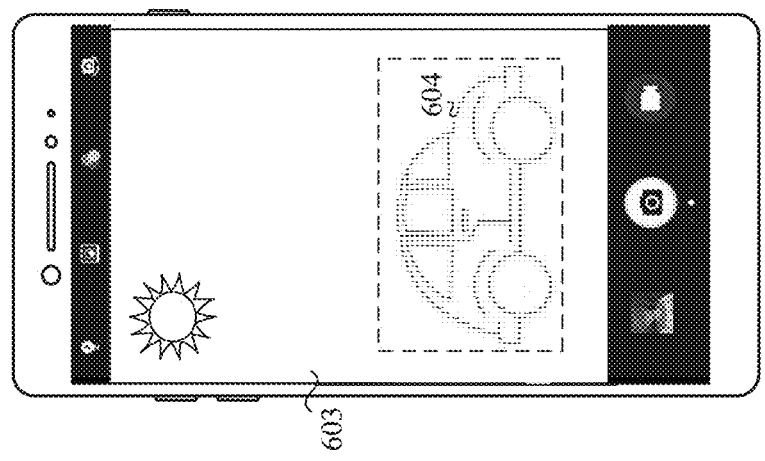
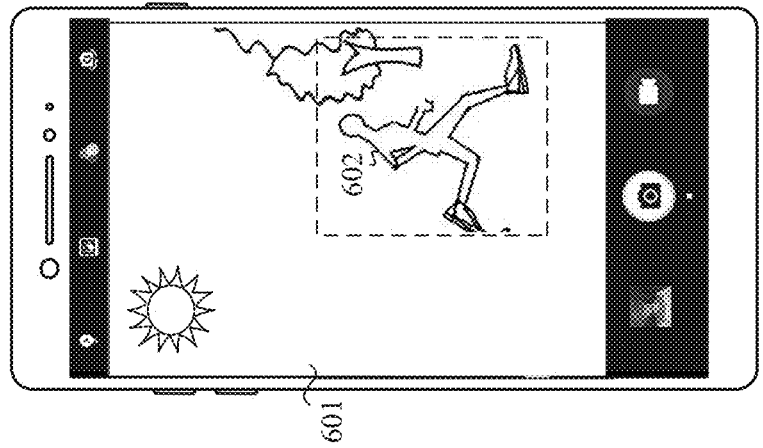

PHOTOGRAPHING METHOD AND ELECTRONIC DEVICE

CROSS-REFERENCE TO RELATED APPLICATIONS

This application is a national stage of International Application No. PCT/CN2019/125067, filed on Dec. 13, 2019, which claims priority to Chinese Patent Application 201910005608.6, filed on Jan. 3, 2019. Both of the aforementioned applications are incorporated herein by reference in their entirety.

TECHNICAL FIELD

This application relates to the field of image processing technologies, and in particular, to a photographing method and an electronic device.

BACKGROUND

An electronic device (for example, a mobile phone or a tablet) is usually integrated with a photographing component (for example, a camera), and may be configured to implement functions such as photographing and video recording. After a user opens the camera, the electronic device may display, in a viewfinder window in real time, a shooting image captured by the camera. In addition, the user may manually select a focus in the shooting image, so that the mobile phone can perform focusing based on the focus selected by the user.

Currently, some mobile phones provide a function of automatically tracking a focus during photographing. For example, if the user selects a to-be-photographed target as a focus in the shooting image, the mobile phone may extract an image feature of the to-be-photographed target, and continuously track the to-be-photographed target in the shooting image based on the image feature. In this way, when the to-be-photographed target is in a moving state, the mobile phone can track the to-be-photographed target in the shooting image. However, when the to-be-photographed target moves outside a photographing range of the camera, the to-be-photographed target also leaves the shooting image of the mobile phone. In this case, the mobile phone determines a new to-be-photographed target in a current shooting image to perform focusing. Consequently, the originally tracked to-be-photographed target is lost. The user needs to frequently perform focusing when the user photographs a moving object, affecting photographing experience.

SUMMARY

This application provides a photographing method and an electronic device, so that a to-be-photographed target can continue to be tracked after the to-be-photographed target returns to a shooting image, to improve accuracy of focusing performed during photographing of a moving object and photographing experience of a user.

To achieve the foregoing objective, the following technical solutions are used in this application.

According to a first aspect, this application provides a photographing method, including: An electronic device obtains a first shooting image, for example, collects the first shooting image by using a camera, where the first shooting image includes a first to-be-photographed object; when displaying the first shooting image, the electronic device may determine, as a to-be-tracked target that needs to be tracked, the first to-be-photographed object for tracking; the electronic device may further obtain a second shooting image, where if the second shooting image does not include the first to-be-photographed object, it indicates that the first to-be-photographed object has left a current shooting image, and the electronic device may continue to display the second shooting image; and subsequently, after the electronic device obtains the third shooting image, if the third shooting image includes the first to-be-photographed object, it indicates that the first to-be-photographed object returns to a current shooting image. In this case, when displaying the third shooting image, the electronic device may re-determine the first to-be-photographed object as the to-be-tracked target for continuous tracking.

In other words, after the electronic device determines a to-be-photographed object as a to-be-tracked target, the electronic device can remember the determined to-be-tracked target. Even if the to-be-photographed object leaves a shooting image of the electronic device in a period of time, when the to-be-photographed object appears again in the shooting image, the electronic device may re-recognize the to-be-photographed object as the to-be-tracked target in a current shooting image, to continuously track the to-be-photographed object. Therefore, accuracy of focusing performed during photographing of a moving object and photographing experience of a user are improved.

In a possible design method, before the electronic device obtains the first shooting image, the method further includes: detecting, by the electronic device, an operation of opening a camera or starting video recording by a user; and in response to the operation, creating, by the electronic device, a feature model based on N (N>1) shooting images captured by the camera, where the feature model includes M (M>1) to-be-photographed targets, and each to-be-photographed target has appeared in at least one of the N shooting images. In other words, each time the electronic device performs photographing, the electronic device may accumulate, in the feature model, a plurality of to-be-photographed targets that appear in a period of time, and the to-be-photographed targets in the feature model may be used as a basis for determining the to-be-tracked target by the electronic device.

In a possible design method, that the electronic device determines the first to-be-photographed object as the to-be-tracked target for tracking includes: determining, by the electronic device, the first to-be-photographed object as the to-be-tracked target if the first to-be-photographed object matches a first to-be-photographed target, where the first to-be-photographed target is one of the M to-be-photographed targets. In this way, each time a to-be-tracked target that needs to be tracked in a current shooting image is determined, if a to-be-photographed object in the current shooting image matches a stored to-be-photographed target, the electronic device may use the to-be-photographed object as the to-be-tracked target for tracking and focusing. Therefore, accuracy of tracking a target by the electronic device during photographing is improved.

In a possible design method, after the electronic device determines the first to-be-photographed object as the to-be-tracked target, the method further includes: updating, by the electronic device, an image feature of the first to-be-photographed target in the feature model based on an image feature of the first to-be-photographed object. In this way, each to-be-photographed target in the feature model may be updated in real time with a change of photographing content, so that each to-be-photographed target in the feature model can accurately reflect, as much as possible, a plurality of persons or objects that the user pays attention to in a current photographing process.

In a possible design method, the second shooting image may include a second to-be-photographed object, and when the electronic device displays the second shooting image, the method further includes: if the second to-be-photographed object matches a second to-be-photographed target, determining, by the electronic device, the second to-be-photographed object as a to-be-tracked target for tracking, where the second to-be-photographed target is one of the M to-be-photographed targets other than the first to-be-photographed target. In other words, the electronic device may switch among a plurality of to-be-tracked targets in a photographing process.

In a possible design method, after the electronic device obtains the second shooting image, the method further includes: if the second to-be-photographed object matches none of the M to-be-photographed targets, adding, by the electronic device, the second to-be-photographed object to the feature model as a new to-be-photographed target, and deleting a to-be-photographed target that is created earliest in the feature model. In this way, the updated feature model may continuously record a plurality of to-be-photographed targets that the user pays more attention to in a recent period of time in a current photographing process.

In a possible design method, the third shooting image may further include the second to-be-photographed object, and that the electronic device re-determines the first to-be-photographed object as the to-be-tracked target for continuous tracking includes: determining, by the electronic device, that a first matching degree between the first to-be-photographed object and the first to-be-photographed target in the M to-be-photographed targets is the highest; determining, by the electronic device, that a second matching degree between the second to-be-photographed object and the second to-be-photographed target in the M to-be-photographed targets is the highest; and if the first matching degree is greater than the second matching degree, and the first matching degree is greater than a matching degree threshold, re-determining, by the electronic device, the first to-be-photographed object as the to-be-tracked target for continuous tracking.

In a possible design method, after the electronic device determines the first to-be-photographed object as the to-be-tracked target for tracking, the method further includes: recording, by the electronic device, a leaving moment of the first to-be-photographed object if the first to-be-photographed object is not tracked in a current shooting image; and after the electronic device obtains the second shooting image, the method further includes: If a time from the leaving moment to a current moment is less than a preset value, it indicates that a focus that the user actually wants to track is probably still the first to-be-photographed object, and therefore, the electronic device may stop recognizing a tracking object in the second shooting image; or if a time from the leaving moment to a current moment is greater than or equal to the preset value, it indicates that the first to-be-photographed object leaves the shooting image for a relatively long time, and the electronic device may re-recognize a tracking object in the second shooting image.

In a possible design method, when the electronic device displays the first shooting image, the method further includes: marking, by the electronic device, a feature point of the first to-be-photographed object in the first shooting image; and when the electronic device displays the third shooting image, the method further includes: marking, by the electronic device, the feature point of the first to-be-photographed object in the third shooting image. The feature point depicts details of a tracked target. The user may more easily and clearly observe a moving status of the tracked target by using the feature point, so that the user can focus on and take a snapshot of the tracked target, to improve photographing experience of the user.

According to a second aspect, this application provides an electronic device, including a touchscreen, one or more cameras, one or more processors, one or more memories, and one or more computer programs. The processor is coupled to the camera, the touchscreen, and the memory, and the one or more computer programs are stored in the memory. When the electronic device runs, the processor executes the one or more computer programs stored in the memory, so that the electronic device performs the photographing method according to any design method in the first aspect.

According to a third aspect, this application provides a computer storage medium, including a computer instruction. When the computer instruction is run on an electronic device, the electronic device is enabled to perform the photographing method according to any design method in the first aspect.

According to a fourth aspect, this application provides a computer program product. When the computer program product is run on an electronic device, the electronic device is enabled to perform the photographing method according to any design method in the first aspect.

It may be understood that, the electronic device in the second aspect, the computer storage medium in the third aspect, and the computer program product in the fourth aspect that are provided above are all configured to perform the corresponding method provided above. Therefore, for beneficial effects that can be achieved by the electronic device, the computer storage medium, and the computer program product, refer to beneficial effects in the corresponding method provided above. Details are not described again herein.

BRIEF DESCRIPTION OF DRAWINGS

FIG. 6A(1) to FIG. 6A(3) are a schematic diagram 4 of an application scenario of a photographing method in accordance with one or more embodiments.

DESCRIPTION OF EMBODIMENTS

The following describes embodiments of this application in detail with reference to the accompanying drawings.

The embodiments of this application provide a photographing method. The photographing method may be applied to a mobile phone, a tablet, a desktop, a laptop, a notebook computer, an ultra-mobile personal computer (UMPC), a handheld computer, a netbook, a personal digital assistant (PDA), a wearable electronic device, a virtual reality device, or the like. This is not limited in the embodiments of this application.

Figure 1:
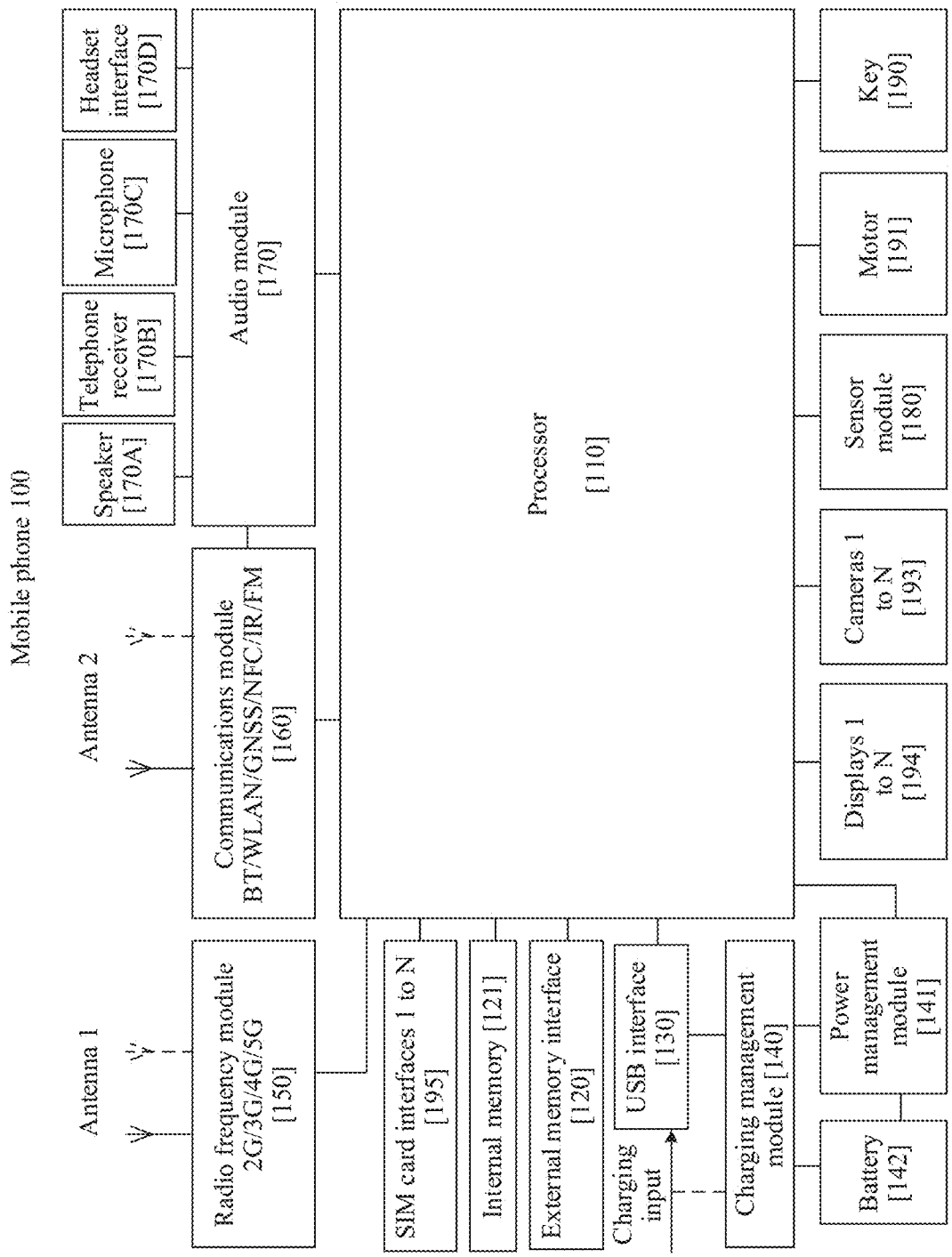
FIG. 1 is a schematic structural diagram 1 of an electronic device in accordance with one or more embodiments.

For example, the foregoing electronic device is a mobile phone. FIG. 1 is a schematic structural diagram of a mobile phone 100.

The mobile phone 100 may include a processor 110, an external memory interface 120, an internal memory 121, a universal serial bus (USB) interface 130, a charging management module 140, a power management module 141, a battery 142, an antenna 1, an antenna 2, a radio frequency module 150, a communications module 160, an audio module 170, a speaker 170A, a telephone receiver 170B, a microphone 170C, a headset interface 170D, a sensor module 180, a key 190, a motor 191, a camera 193, a display 194, a subscriber identification module (SIM) card interface 195, and the like.

It may be understood that an illustrated structure in the embodiments of this application does not constitute a specific limitation on the mobile phone 100. In some other embodiments of this application, the mobile phone 100 may include more or fewer components than those shown in the figure, or combine some components, or divide some components, or have different component arrangements. The parts in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a nerve center and a command center of the mobile phone 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110. Therefore, system efficiency is improved.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The USB interface 130 is an interface that conforms to a USB standard specification, and may be a mini USB interface, a micro USB interface, a USB Type C interface, or the like. The USB interface 130 may be configured to connect to a charger to charge the mobile phone 100, or may be configured to transmit data between the mobile phone 100 and a peripheral device. The USB interface 130 may alternatively be configured to connect to a headset, to play audio by using the headset. The interface may alternatively be configured to connect to another electronic device such as an AR device.

It may be understood that an interface connection relationship between the modules illustrated in the embodiments of this application is merely an example for description, and does not constitute a limitation on a structure of the mobile phone 100. In some other embodiments of this application, the mobile phone 100 may alternatively use an interface connection manner different from that in the foregoing embodiments, or use a combination of a plurality of interface connection manners.

The charging management module 140 is configured to receive charging input from the charger. The charger may be a wireless charger or a wired charger. In some embodiments of wired charging, the charging management module 140 may receive charging input of the wired charger by using the USB interface 130. In some embodiments of wireless charging, the charging management module 140 may receive wireless charging input by using a wireless charging coil of the mobile phone 100. The charging management module 140 charges the electronic device by using the power management module 141 while charging the battery 142.

The power management module 141 is configured to connect the battery 142, the charging management module 140, and the processor 110. The power management module 141 receives input of the battery 142 and/or the charging management module 140, and supplies power to the processor 110, the internal memory 121, an external memory, the display 194, the camera 193, the communications module 160, and the like. The power management module 141 may be further configured to monitor parameters such as a battery capacity, a battery cycle count, a state of battery health (an electric leakage or impedance). In some other embodiments, the power management module 141 may alternatively be disposed in the processor 110. In some other embodiments, the power management module 141 and the charging management module 140 may alternatively be disposed in a same component.

A wireless communication function of the mobile phone 100 may be implemented by using the antenna 1, the antenna 2, the radio frequency module 150, the communications module 160, the modem processor, the baseband processor, and the like.

The antenna 1 and the antenna 2 are configured to transmit and receive an electromagnetic wave signal. Each antenna in the mobile phone 100 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The radio frequency module 150 may provide a wireless communication solution that is applied to the mobile phone 100 and that includes 2G/3G/4G/5G. The radio frequency module 150 may include at least one filter, a switch, a power amplifier, a low noise amplifier (LNA), and the like. The radio frequency module 150 may receive an electromagnetic wave by using the antenna 1, perform processing such as filtering or amplification on the received electromagnetic wave, and transfer the electromagnetic wave to the modem processor for demodulation. The radio frequency module 150 may further amplify a signal modulated by the modem processor, and convert the signal into an electromagnetic wave for radiation by using the antenna 1. In some embodiments, at least some function modules in the radio frequency module 150 may be disposed in the processor 110. In some embodiments, at least some function modules in the radio frequency module 150 may be disposed in a same component as at least some modules in the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal by using an audio device (which is not limited to the speaker 170A, the telephone receiver 170B, or the like), or displays an image or a video by using the display 194. In some embodiments, the modem processor may be an independent component. In some other embodiments, the modem processor may be independent of the processor 110, and is disposed in a same component as the radio frequency module 150 or another function module.

The communications module 160 may provide a wireless communication solution that is applied to the mobile phone 100 and that include a wireless local area network (WLAN) (for example, a wireless fidelity (Wi-Fi) network), Bluetooth (BT), a global navigation satellite system (GNSS), frequency modulation (FM), a near field communication (NFC) technology, or an infrared (IR) technology. The communications module 160 may be one or more components integrating at least one communications processor module. The communications module 160 receives an electromagnetic wave by using the antenna 2, performs frequency modulation and filtering processing on an electromagnetic wave signal, and sends a processed signal to the processor 110. The communications module 160 may further receive a to-be-sent signal from the processor 110, perform frequency modulation and amplification on the signal, and convert the signal into an electromagnetic wave for radiation by using the antenna 2.

In some embodiments, the antenna 1 of the mobile phone 100 is coupled to the radio frequency module 150, and the antenna 2 is coupled to the communications module 160, so that the mobile phone 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS)), and/or a satellite based augmentation system (SBAS).

The mobile phone 100 implements a display function by using the GPU, the display 194, the application processor, and the like. The GPU is a microprocessor for image processing, and is connected to the display 194 and the application processor. The GPU is configured to perform mathematical and geometric calculation, and is configured to render an image. The processor 110 may include one or more GPUs that execute a program instruction to generate or change display information.

The display 194 is configured to display an image, a video, and the like. The display 194 includes a display panel. The display panel may use a liquid crystal display (LCD), an organic light-emitting diode (OLED), an active-matrix organic light emitting diode or an active-matrix organic light emitting diode (AMOLED), a flexible light-emitting diode (FLED), a miniLED, a microLED, a micro-OLED, a quantum dot light-emitting diode (QLED), or the like. In some embodiments, the mobile phone 100 may include one or N displays 194, where N is a positive integer greater than 1.

The external memory interface 120 may be configured to connect to an external storage card such as a card, to extend a storage capability of the mobile phone 100. The external storage card communicates with the processor 110 by using the external memory interface 120, to implement a data storage function, for example, store files such as music and a video into the external storage card.

The internal memory 121 may be configured to store computer-executable program code, and the executable program code includes an instruction. The processor 110 runs the instruction stored in the internal memory 121, to implement various function applications and data processing of the mobile phone 100. The internal memory 121 may include a program storage area and a data storage area. The program storage area may store an operating system, an application required by at least one function (for example, a voice playing function or an image playing function), and the like. The data storage area may store data (such as audio data and an address book) created during use of the mobile phone 100, and the like. In addition, the internal memory 121 may include a high-speed random-access memory, and may further include a nonvolatile memory, for example, at least one magnetic disk storage device, a flash memory device, or a universal flash storage (UFS).

The mobile phone 100 may implement an audio function by using the audio module 170, the speaker 170A, the telephone receiver 170B, the microphone 170C, the headset interface 170D, the application processor, and the like, for example, music playing and recording.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The mobile phone 100 may listen to music by using the speaker 170A, or listen to a hands-free call.

The telephone receiver 170B, also referred to as an "earpiece", is configured to convert an audio electrical signal into a sound signal. When a call is answered or a voice message is received by using the mobile phone 100, the telephone receiver 170B may be put close to a human ear to listen to a voice.

The microphone 170C, also referred to as a "mike" or a "voice transmitter", is configured to convert a sound signal into an electrical signal. When making a call or sending a voice message, a user may make a sound near the microphone 170C by using the mouth of the user to input a sound signal to the microphone 170C. The mobile phone 100 may be provided with at least one microphone 170C. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset interface 170D is configured to connect to a wired headset. The headset interface 170D may be a USB interface 130, or may be a 3.5 mm open mobile terminal platform (OMTP) standard interface or cellular telecommunications industry association of the USA (CTIA) standard interface.

The sensor module 180 may include a pressure sensor, a gyro sensor, a barometric pressure sensor, a magnetic sensor, an acceleration sensor, a range sensor, an optical proximity sensor, a fingerprint sensor, a temperature sensor, a touch sensor, an ambient optical sensor, a bone conduction sensor, and the like. This is not limited in the embodiments of this application.

The key 190 includes a power key, a volume key, and the like. The key 190 may be a mechanical key, or may be a touch key. The mobile phone 100 receives key input, and generates key signal input related to a user setting and function control of the mobile phone 100.

The motor 191 may generate a vibration prompt. The motor 191 may be used for an incoming call vibration prompt and a touch vibration feedback. For example, touch operations applied to different applications (for example, photographing and audio playback) may correspond to different vibration feedback effects. The motor 191 may also correspond to different vibration feedback effects for touch operations applied to different areas of the display 194. Different application scenarios (for example, a time reminder, information receiving, an alarm clock, and a game) may also correspond to different vibration feedback effects. Customization of the touch vibration feedback effect may be further supported.

The SIM card interface 195 is configured to connect to a SIM card. The SIM card may be inserted into the SIM card interface 195 or plugged from the SIM card interface 195, to implement contact with or separation from the mobile phone 100. The mobile phone 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The mobile phone 100 interacts with a network by using the SIM card, to implement functions such as calling and data communication. In some embodiments, the mobile phone 100 uses an eSIM card, namely, an embedded SIM card. The eSIM card may be embedded in the mobile phone 100, and cannot be separated from the mobile phone 100.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is open, a ray of light is transmitted to a light-sensitive element of the camera through a lens, an optical signal is converted into an electrical signal, the light-sensitive element of the camera transmits the electrical signal to the ISP for processing, and the electrical signal is converted into an image that can be seen. The ISP may further optimize an algorithm for a focus, noise, brightness, and complexion. The ISP may further optimize parameters such as exposure and a color temperature of a photographing scene. In some embodiments, the ISP may be disposed in the camera 193.

The camera 193 is configured to capture a static image or a video. An optical image of an object is generated by using a lens, and is projected to a light-sensitive element. The light-sensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras 193, where N is a positive integer greater than 1.

The digital signal processor is configured to process a digital signal. In addition to a digital image signal, the digital signal processor may further process another digital signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 can play or record videos in a plurality of coding formats, for example, moving picture experts group (MPEG) 1, MPEG 2, MPEG 3, and MPEG 4.

The NPU is a neural-network (NN) computing processor, and quickly processes input information by using a biological neural network structure such as a mode of transmission between human-brain nerve cells, and may further constantly perform self-learning. Applications such as intelligent cognition of the mobile phone 100, such as image recognition, facial recognition, speech recognition, and text understanding, can be implemented by using the NPU.

In one or more embodiments of this application, the mobile phone 100 may capture a shooting image of each frame in real time by using the camera 193. In addition, the mobile phone 100 may recognize a to-be-photographed target in the shooting image by using the ISP, and track and focus the to-be-photographed target in real time.

Figure 2:
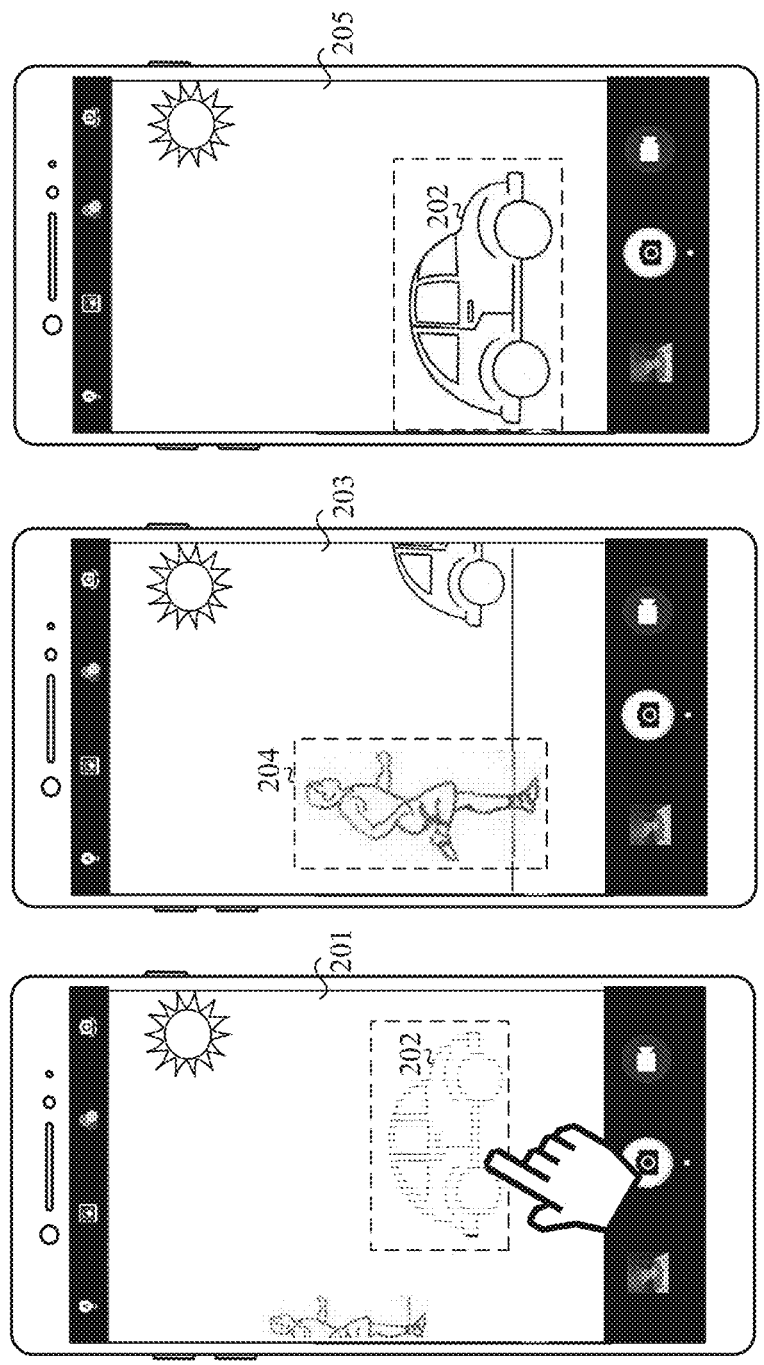
FIG. 2(a) to FIG. 2(c) are a schematic diagram 1 of an application scenario of a photographing method in accordance with one or more embodiments.

For example, as shown in FIG. 2(a), after opening the camera 193, the mobile phone 100 may capture a first shooting image 201 by using the camera 193. The mobile phone 100 may automatically recognize a to-be-photographed target in the first shooting image 201, or the user may manually select a to-be-photographed target in the first shooting image 201. For example, the user selects a car 202 in the first shooting image 201 as the to-be-photographed target. After detecting that the user taps the car 202 in the first shooting image 201, the mobile phone 100 may extract and record an image feature of the car 202.

In some examples, after opening the camera 193, the mobile phone 100 collects and updates a captured shooting image at a specific frequency. As shown in FIG. 2(b), after collecting the first shooting image 201, the mobile phone 100 may continue to capture a next shooting image by using the camera 193, for example, a second shooting image 203. In this case, the mobile phone may recognize, based on the image feature of the car 202, whether the second shooting image 203 includes the car 202. If the second shooting image 203 does not include the car 202, the mobile phone 100 may re-recognize a to-be-photographed target in the second shooting image 203. For example, the mobile phone 100 may use a person 204 in the second shooting image 203 as a new to-be-photographed target, and the mobile phone 100 may extract and record an image feature of the person 204 in the second shooting image 203.

Subsequently, as shown in FIG. 2(c), the mobile phone 100 may continue to capture a next shooting image by using the camera 193, for example, a third shooting image 205. Because the mobile phone 100 has recorded the image feature of the car 202 and the image feature of the person 204 in this case, the mobile phone 100 may recognize, based on the two image features, whether the third shooting image 205 includes the car 202 or the person 204. Still as shown in FIG. 2(c), the mobile phone 100 may recognize a specific location of the car 202 in the third shooting image 205 based on the image feature of the car 202. In this case, the mobile phone 100 may re-determine the car 202 as a to-be-photographed target at this time for focusing.

In some instances, if a plurality of to-be-photographed objects in a same shooting image respectively correspond to a plurality of recorded to-be-photographed targets, for example, when a to-be-photographed object 1 in a current shooting image matches a recorded to-be-photographed target 1, and a to-be-photographed object 2 in the current shooting image matches a recorded to-be-photographed target 2, the mobile phone may determine an object with a higher matching degree as a to-be-photographed target in the current shooting image. This is described in detail in subsequent embodiments, and therefore details are not described herein again.

In other words, in a photographing process, the mobile phone may accumulate image features of a plurality of to-be-photographed targets, and continuously update the image features of the to-be-photographed targets. Each time a to-be-tracked target that needs to be tracked in a current shooting image is to be determined, if an image feature of a to-be-photographed object in the current shooting image matches a stored image feature of a to-be-photographed target, the mobile phone may use the to-be-photographed object as the to-be-tracked target for tracking and focusing. In this way, even if a to-be-photographed target leaves a shooting image of the mobile phone in a period of time, when the to-be-photographed target appears again in the shooting image, because the mobile phone records an image feature of the to-be-photographed target, the mobile phone may re-recognize the to-be-photographed target in the current shooting image, to continuously track the to-be-photographed object. Therefore, photographing experience of the user is improved.

Figure 3:
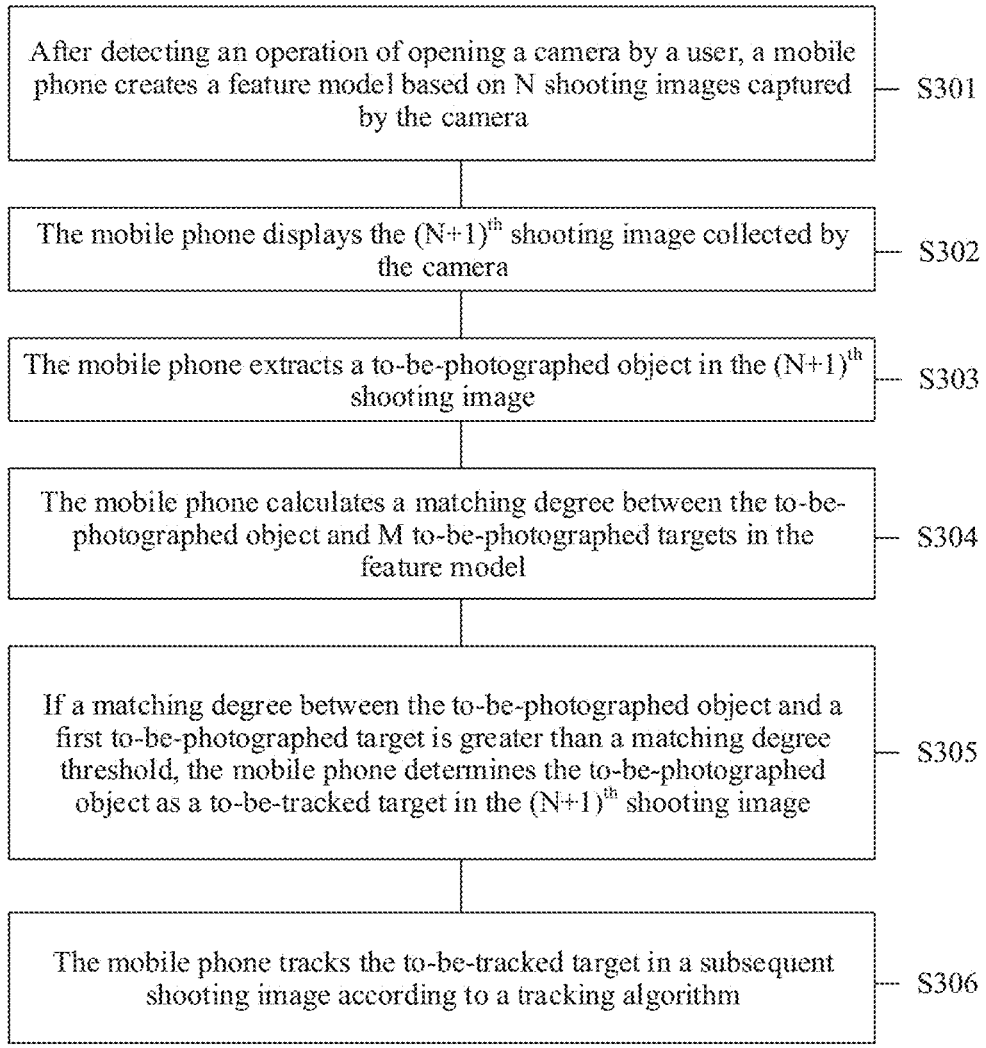
FIG. 3 is a schematic flowchart of a photographing method in accordance with one or more embodiments.

The following describes in detail a photographing method provided in this application with reference to the accompanying drawings by using an example in which an electronic device is a mobile phone. As shown in FIG. 3, the photographing method includes the following steps S301 to S306.

S301: After detecting an operation of opening a camera by a user, a mobile phone creates a feature model based on N shooting images captured by the camera, where the feature model includes image features of M to-be-photographed targets, N>1, and M>1.

In some examples, a camera application (Camera App) is installed in the mobile phone, and an operation of opening the Camera App by the user (for example, the user taps an icon of the Camera App) may be considered as the operation of opening the camera by the user. Alternatively, when running another application, the mobile phone may detect the operation of opening the camera by the user. For example, when the user chats with a contact by using a social media application, such as a WeChat App, if the mobile phone detects that the user taps a camera function provided by the WeChat App, the mobile phone may invoke the Camera App to open the camera.

After the mobile phone detects the operation of opening the camera by the user, in response to the operation, the mobile phone may display, in a viewfinder window in real time, a shooting image captured by the camera. In some examples, the mobile phone displays each frame of shooting image in the viewfinder window at a specific frame rate (frames per second, FPS). For example, if the frame rate is 30 frames/second, the mobile phone may display 30 frames of shooting images captured by the camera within one second.

In some examples, the user photographs some persons or objects with a purpose during photographing. To continuously track a person or an object that the user wants to photograph, after opening the camera, the mobile phone may create a feature model based on the first several frames of shooting images captured by the camera, and store, in the feature model, image features of a plurality of to-be-photographed targets that the user may want to track and that are determined by the mobile phone. For example, the mobile phone may preset a rule that a feature model created each time of photographing includes image features of M to-be-photographed targets.

Figure 4:
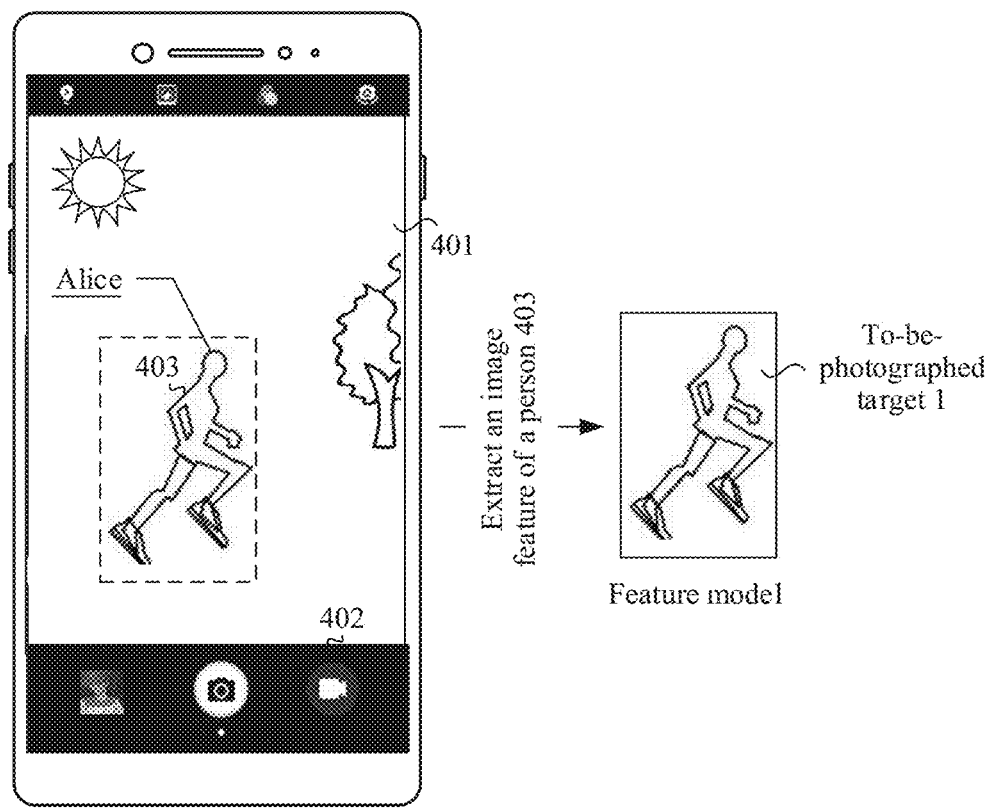
FIG. 4 is a schematic diagram 2 of an application scenario of a photographing method in accordance with one or more embodiments.

For example, as shown in FIG. 4, after obtaining a first frame of shooting image 401 captured by the camera, the mobile phone may display the shooting image 401 in a viewfinder window 402 of the mobile phone. In addition, the mobile phone may determine a to-be-photographed target in the shooting image 401 according to a preset image recognition algorithm.

For example, if the mobile phone recognizes that the shooting image 401 includes a person or a face, the mobile phone may determine the recognized person or face as the to-be-photographed target. Alternatively, after recognizing that the shooting image 401 includes a person (or a face), the mobile phone may further recognize whether the person (or the face) is a person (or a face) that appears at a relatively high frequency in a gallery of the mobile phone. The mobile phone may periodically extract a person (or a face) that frequently appears in the gallery, and the user may further manually mark a name of the person (or the face), for example, "Baby" or "Alice". As shown in FIG. 4, after recognizing a person 403 in the shooting image 401, the mobile phone may further determine whether the person 403 is a marked person. If it is determined that the person 403 is a person marked as "Alice" by the user in the gallery, the mobile phone may determine the person 403 in the shooting image 401 as the to-be-photographed target. In addition, still as shown in FIG. 4, the mobile phone may further display a mark "Alice" of the person 403 in the shooting image 401, to prompt the user that the person Alice has been recognized in the current shooting image, and the person Alice is used as the current to-be-photographed target.

In some other embodiments, if the mobile phone recognizes that the shooting image 401 includes an object (for example, a car, an airplane, or an animal) that can move, the mobile phone may determine, as the to-be-photographed target, the recognized object that can move. Alternatively, the mobile phone may determine a person or an object located in the center of the shooting image 401 as the to-be-photographed target. An exemplary method for determining the to-be-photographed target in the shooting image by the mobile phone is not limited in this application.

It may be understood that an exemplary image recognition algorithm used when the mobile phone recognizes the to-be-photographed target is not limited this application. For example, the mobile phone may recognize the to-be-photographed target in the shooting image according to a deep neural network algorithm such as a single shot multibox detector (SSD) or a you only look once version 3 (YOLO v3). In some instances, the to-be-photographed target is a person or an object that the user pays attention to in the shooting image.

For example, the mobile phone determines the person 403 in the shooting image 401 as the to-be-photographed target. After the mobile phone determines the person 403 in the shooting image 401 as the to-be-photographed target, the mobile phone may further extract an image feature of the person 403 from the shooting image 401. For example, the mobile phone may extract the image feature of the person 403 according to a preset feature extraction algorithm, to obtain a feature vector of the person 403. In this case, the mobile phone adds an image feature of a to-be-photographed target (namely, the person 403) to a feature model created in the current photographing process.

Figure 5:
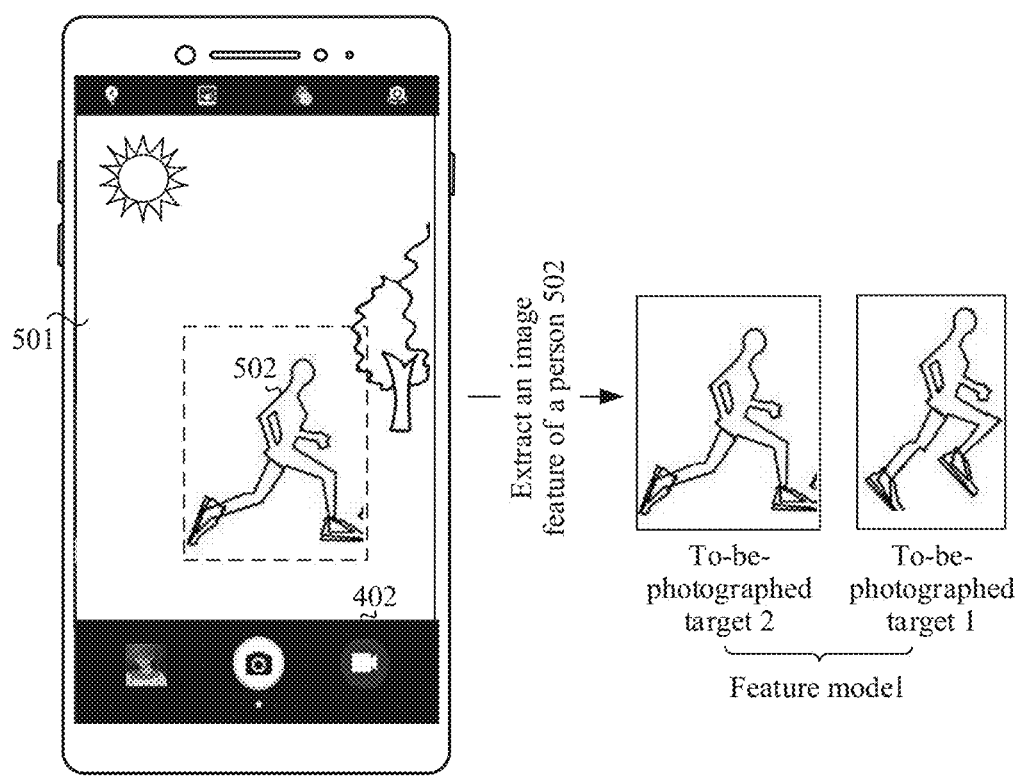
FIG. 5 is a schematic diagram 3 of an application scenario of a photographing method in accordance with one or more embodiments.

Further, as shown in FIG. 5, the mobile phone may display, in the viewfinder window 402, the second frame of shooting image 501 captured by the camera. Because a time interval between the second frame of shooting image 501 and the first frame of shooting image 401 is usually very short, an image in the shooting image 501 may be slightly different from an image in the shooting image 401. In addition, the mobile phone may continue to recognize a to-be-photographed target in the shooting image 501 according to the foregoing method. For example, the mobile phone may determine a photographed person 502 in the shooting image 501 as the to-be-photographed target. Further, the mobile phone may extract an image feature of the person 502 according to the foregoing method. In this case, although the person 403 in the shooting image 401 and the person 502 in the shooting image 501 are a same to-be-photographed object, because the person 403 and the person 502 have different motion postures, the image feature of the person 502 and the image feature of the person 403 that are extracted by the mobile phone are different. In this case, the feature model created by the mobile phone in the current photographing process includes the image features of the two to-be-photographed targets: the person 403 and the person 502.

If the mobile phone presets that image features of five to-be-photographed targets need to be created in the feature model, the mobile phone may continue to separately obtain image features of to-be-photographed targets in the third frame of shooting image, the fourth frame of shooting image, and the fifth frame of shooting image according to the foregoing method. For example, as shown in FIG. 6A(1), after obtaining the third frame of shooting image 601, the mobile phone may determine a person 602 in the shooting image 601 as a to-be-photographed target, and extract an image feature of the person 602. For example, as shown in FIG. 6A(2), after obtaining the fourth frame of shooting image 603, the mobile phone may determine a car 604 in the shooting image 603 as a to-be-photographed target, and extract an image feature of the car 604. For example, as shown in FIG. 6A(3), after obtaining the fifth frame of shooting image 605, the mobile phone may determine a car 606 in the shooting image 605 as a to-be-photographed target, and extract an image feature of the car 606.

Figure 6B:
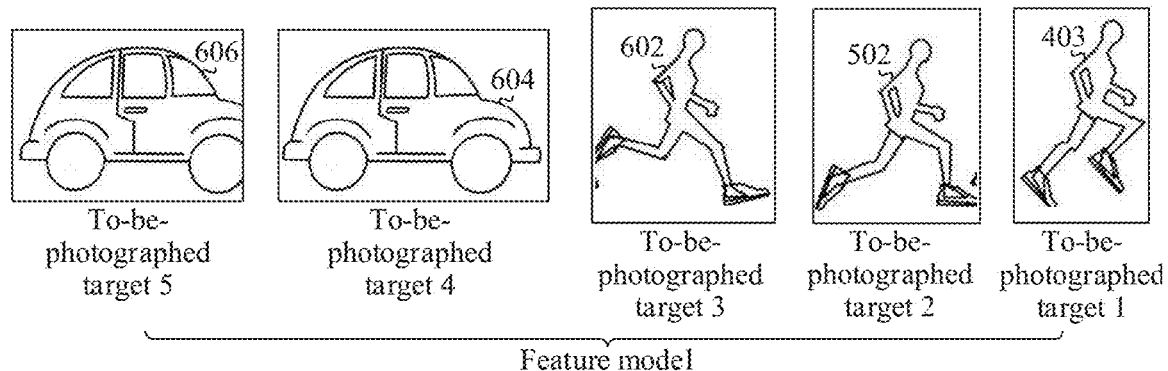
FIG. 6B is a schematic diagram 5 of an application scenario of a photographing method in accordance with one or more embodiments.

In this way, as shown in FIG. 6B, the mobile phone may separately extract image features of the five to-be-photographed targets in the first frame of shooting image to the fifth frame of shooting image, that is, the image feature of the person 403, the image feature of the person 502, the image feature of the person 602, the image feature of the car 604, and the image feature of the car 606. The mobile phone may use the image features of the five to-be-photographed targets as the feature model, to recognize a to-be-tracked target in a subsequent shooting image. It may be understood that in subsequent embodiments, that the feature model includes image features of five to-be-photographed targets is used as an example for description. A person skilled in the art may set a quantity of image features of to-be-photographed targets in the feature model based on an actual application scenario or actual experience, for example, 30 or 40. This is not limited in this application.

In some examples, the mobile phone may further dynamically update the to-be-photographed target in the feature model and the image feature of the to-be-photographed target. This is described in detail in the subsequent embodiments, and details are not described herein again.

S302: The mobile phone displays the $(N+1)^{th}$ shooting image collected by the camera.

Figure 7:
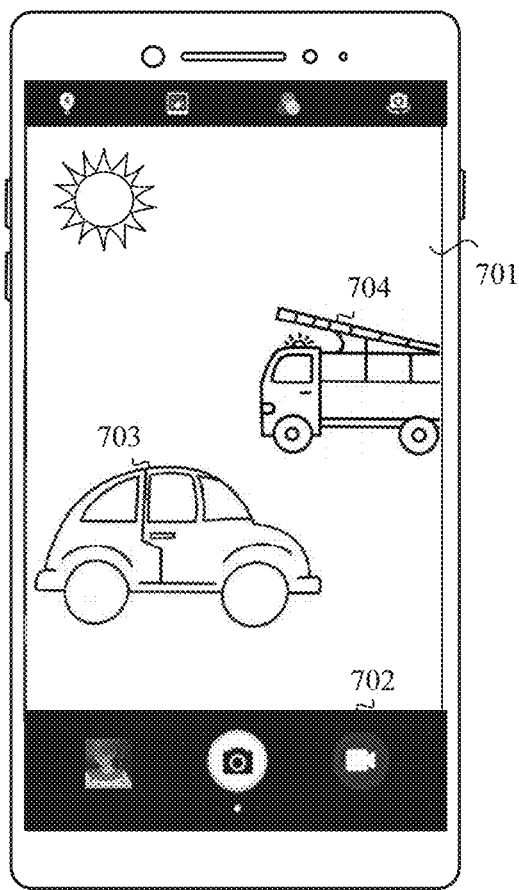
FIG. 7 is a schematic diagram 6 of an application scenario of a photographing method in accordance with one or more embodiments.

While creating the feature model in the current photographing process, the mobile phone may continuously display each frame of shooting image collected by the camera. If the mobile phone establishes the feature model by using the first N frames of shooting images, when the mobile phone obtains the $(N+1)^{th}$ frame of shooting image, the mobile phone may continue to display, in the viewfinder window, the $(N+1)^{th}$ frame of shooting image captured by the camera. As shown in FIG. 7, the mobile phone may display an obtained sixth frame of shooting image 701 in a viewfinder window 702.

For example, when displaying each frame of shooting image, the mobile phone may query whether the quantity of image features of the to-be-photographed target in the feature model reaches a preset threshold M. For example, for the preset threshold M, M=5. If a quantity of image features of to-be-photographed targets in a current feature model is less than 5, the mobile phone may continue to perform step S301 to create an image feature of a new to-be-photographed target in the feature model. Correspondingly, if the quantity of image features of the to-be-photographed target in the current feature model is equal to five, the mobile phone may continue to perform step S303.

S303: The mobile phone extracts a to-be-photographed object in the $(N+1)^{th}$ shooting image.

Similar to a case in which the mobile phone recognizes a to-be-photographed target in a shooting image when creating the foregoing feature model, the mobile phone may recognize, in the $(N+1)^{th}$ shooting image, the to-be-photographed object included in the shooting image. A difference is that after the feature model is created, the mobile phone may recognize one or more to-be-photographed objects in the shooting image.

That the shooting image 701 shown in FIG. 7 is the $(N+1)^{th}$ shooting image is still used as an example. The mobile phone may recognize, according to a preset target detection algorithm, that to-be-photographed objects included in the shooting image 701 are a first car 703 and a second car 704. Further, the mobile phone may extract an image feature of the first car 703 and an image feature of the second car 704 from the shooting image 701, so that the mobile phone subsequently determines, based on the image features of the two to-be-photographed objects, a to-be-photographed object as a to-be-tracked target in the shooting image 701.

S304: The mobile phone calculates a matching degree between the to-be-photographed object and the M to-be-photographed targets in the feature model.

That the first car 703 and the second car 704 in the shooting image 701 are to-be-photographed objects is still used as an example. The mobile phone may separately calculate a matching degree between the first car 703 and the M to-be-photographed targets in the feature model, and a matching degree between the second car 704 and the M to-be-photographed targets in the feature model.

Figure 8:
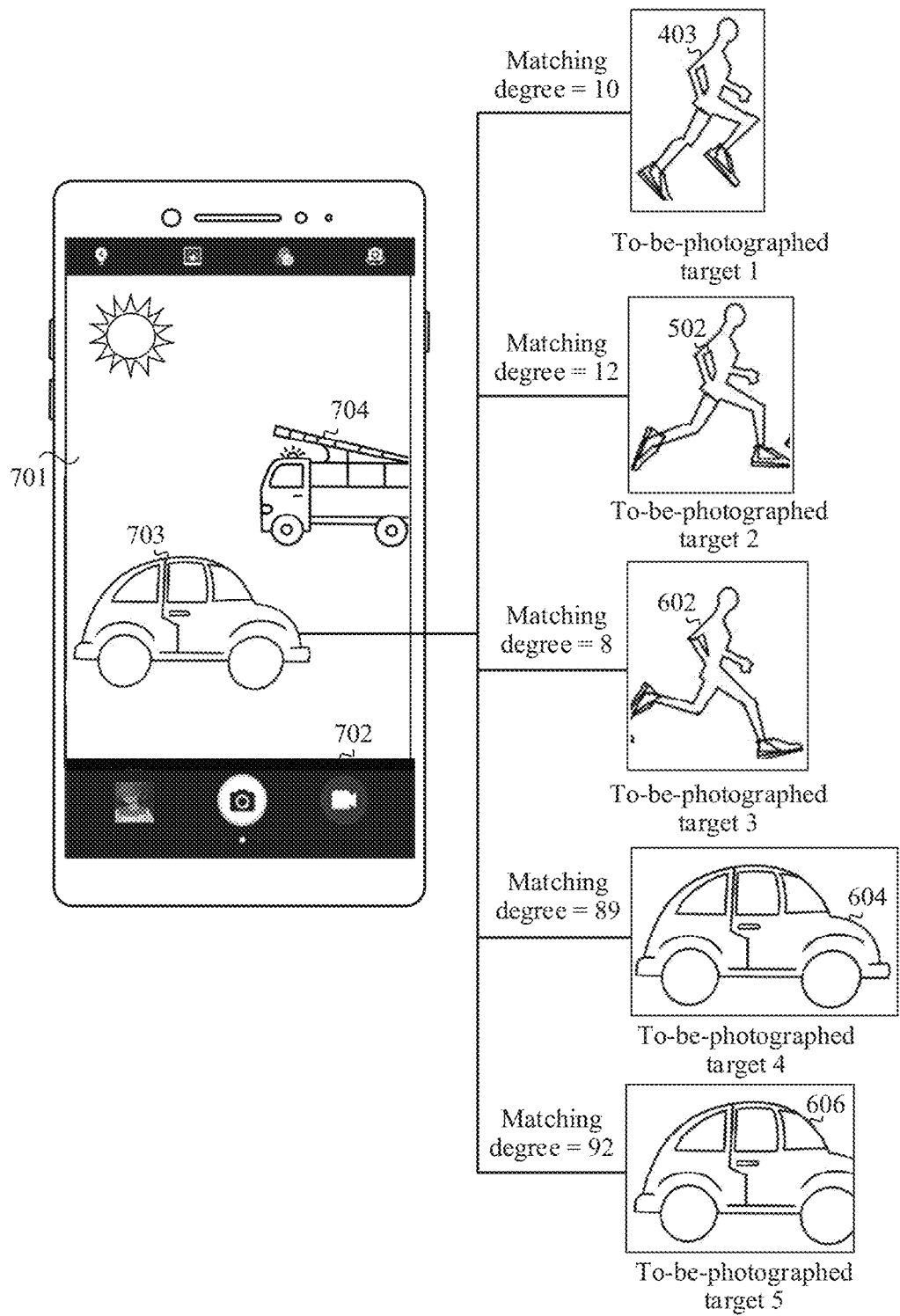
FIG. 8 is a schematic diagram 7 of an application scenario of a photographing method in accordance with one or more embodiments.

For example, after extracting the image feature of the first car 703, the mobile phone may calculate a matching degree between the image feature of the first car 703 and each of the image features of the M to-be-photographed targets in the feature model. For example, as shown in FIG. 8, a matching degree between the image feature of the first car 703 and the image feature of the person 403 is 10 points (a full score is 100 points), a matching degree between the image feature of the first car 703 and the image feature of the person 502 is 12 points, a matching degree between the image feature of the first car 703 and the image feature of the person 602 is eight points, a matching degree between the image feature of the first car 703 and the image feature of the car 604 is 89 points, and a matching degree between the image feature of the first car 703 and the image feature of the car 606 is 92 points. It can be learned that the matching degree between the first car 703 in the shooting image 701 and the car 606 in the feature model is the highest, and a score is 92 points.

Figure 9:
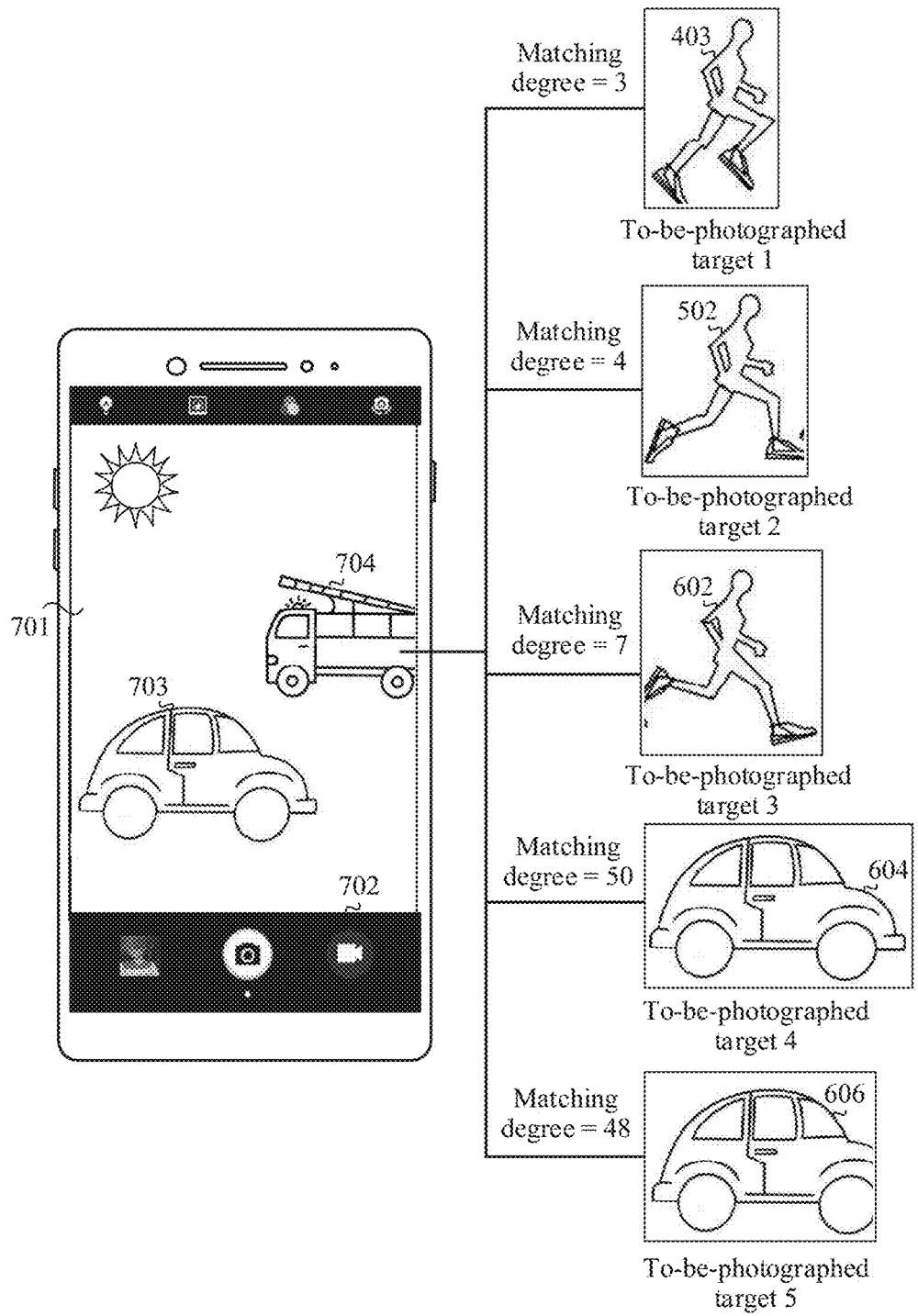
FIG. 9 is a schematic diagram 8 of an application scenario of a photographing method in accordance with one or more embodiments.

For example, after extracting the image feature of the second car 704, the mobile phone may calculate a matching degree between the image feature of the first car 704 and each of the image features of the M to-be-photographed targets in the feature model. For example, as shown in FIG. 9, a matching degree between the image feature of the second car 704 and the image feature of the person 403 is 3 points (a full score is also 100 points), a matching degree between the image feature of the second car 704 and the image feature of the person 502 is four points, a matching degree between the image feature of the second car 704 and the image feature of the person 602 is seven points, a matching degree between the image feature of the second car 704 and the image feature of the car 604 is 50 points, and a matching degree between the image feature of the second car 704 and the image feature of the car 606 is 48 points. It can be learned that the matching degree between the second car 704 in the shooting image 701 and the car 604 in the feature model is the highest, and a score is 50 points.

It should be noted that a person skilled in the art may set an exemplary matching degree calculation method based on actual experience or an actual application scenario. For example, the mobile phone may calculate a similarity between an image feature of a to-be-photographed object and an image feature of the to-be-photographed target, and use the similarity as a matching degree between the to-be-photographed object and the to-be-photographed target. This is not limited in this application.

S305: If a matching degree between the to-be-photographed object and a first to-be-photographed target is greater than a matching degree threshold, the mobile phone determines the to-be-photographed object as a to-be-tracked target in the $(N+1)^{th}$ shooting image.

In some examples, a matching degree threshold (for example, 87 points) may be preset in the mobile phone. Each to-be-photographed target stored in the feature model is a person or an object that the user wants to photograph and that are determined by the mobile phone. Therefore, when a matching degree between a to-be-photographed object and a to-be-photographed target is greater than the matching degree threshold, it indicates that the user may focus the to-be-photographed object in a current shooting image. In this case, the mobile phone may determine the to-be-photographed object as a to-be-tracked target in the current shooting image for tracking.

For example, the mobile phone may determine, by using step S304, that the matching degree between the first car 703 in the shooting image 701 and the car 606 is the highest, and a score is 92 points, and that the matching degree between the second car 704 in the shooting image 701 and the car 604 is the highest, and a score is 50 points. If the matching degree threshold is 87 points, the matching degree between the first car 703 in the shooting image 701 and the car 606 in the feature model is greater than the matching degree threshold, and the mobile phone may determine the first car 703 as the to-be-tracked target in the shooting image 701.

In some embodiments, if a plurality of matching degrees between to-be-photographed objects and to-be-photographed targets are all greater than the matching degree threshold, for example, a matching degree between the first car 703 and a to-be-photographed target 1 is 92 points, and a matching degree between the second car 704 and a to-be-photographed target 2 is 90 points. In this case, the mobile phone may determine, as the to-be-tracked target in the shooting image 701, a to-be-photographed object (for example, the first car 703) that has a highest matching degree with the to-be-photographed target.

Alternatively, if each matching degree between a to-be-photographed object and a to-be-photographed target is not greater than the matching degree threshold, for example, a matching degree between the first car 703 and a to-be-photographed target 1 is 50 points, and a matching degree between the second car 704 and a to-be-photographed target 2 is 60 points, it indicates that no to-be-photographed object in the shooting image 701 matches the to-be-photographed target. In this case, a to-be-photographed object in the shooting image 701 may newly appear in a current photographing process. Therefore, the mobile phone may give up determining the to-be-tracked target in the shooting image 701.

It can be learned that because the feature model created by the mobile phone includes image features of a plurality of to-be-photographed targets in a past period of time, the mobile phone may match a to-be-photographed object and each of the plurality of to-be-photographed targets when determining the to-be-tracked target in the current shooting image. Even if the to-be-photographed object in the current shooting image does not appear in a latest frame of shooting image or a plurality of frames of shooting images, if a matching degree between the to-be-photographed object and a to-be-photographed target in the feature model is high enough, the mobile phone may determine the to-be-photographed object as the to-be-tracked target in the current shooting image. Therefore, accuracy of tracking a target by the mobile phone during photographing is improved.

S306: The mobile phone tracks the to-be-tracked target in a subsequent shooting image according to a tracking algorithm.

After determining the to-be-tracked target in the $(N+1)^{th}$ shooting image, the mobile phone may track the to-be-tracked target in the subsequent $(N+2)^{th}$ shooting image, the $(N+3)^{th}$ shooting image, . . . , and the $(N+X)^{th}$ shooting image according to a preset tracking algorithm. Certainly, when tracking the to-be-tracked target, the mobile phone may further focus on the tracked target, so that the tracked target is photographed more clearly in the shooting image.

To prevent the mobile phone from losing the tracked target or tracking a wrong target, the mobile phone may set a tracking period (for example, X frames). In the tracking period, for example, in the $(N+1)^{th}$ frame of shooting image to the $(N+X)^{th}$ frame of shooting image, the mobile phone may track, according to the tracking algorithm, the to-be-tracked target (for example, the first car 703) determined in the $(N+1)^{th}$ frame of shooting image. When the mobile phone obtains the $(N+X+1)^{th}$ frame of shooting image, the mobile phone may perform steps S303 to S305 again, to determine a to-be-tracked target in a next tracking period, and to track the to-be-tracked target in the next tracking period according to the tracking algorithm.

The tracking algorithm may be a centroid tracking algorithm, a correlation tracking algorithm, an edge tracking algorithm, or the like. This is not limited in this embodiment of this application.

S307: The mobile phone updates the image features of the M to-be-photographed targets in the feature model.

When the mobile phone determines the to-be-tracked target (namely, step S305), the mobile phone may further update the feature model based on a matching degree between each to-be-photographed object in the current shooting image and each to-be-photographed target in the feature model, so that each to-be-photographed target in the feature model may be updated in real time with a change of photographing content. In this way, each to-be-photographed target in the feature model can accurately reflect, as much as possible, a plurality of persons or objects that the user pays attention to in a current photographing process.

Figure 10:
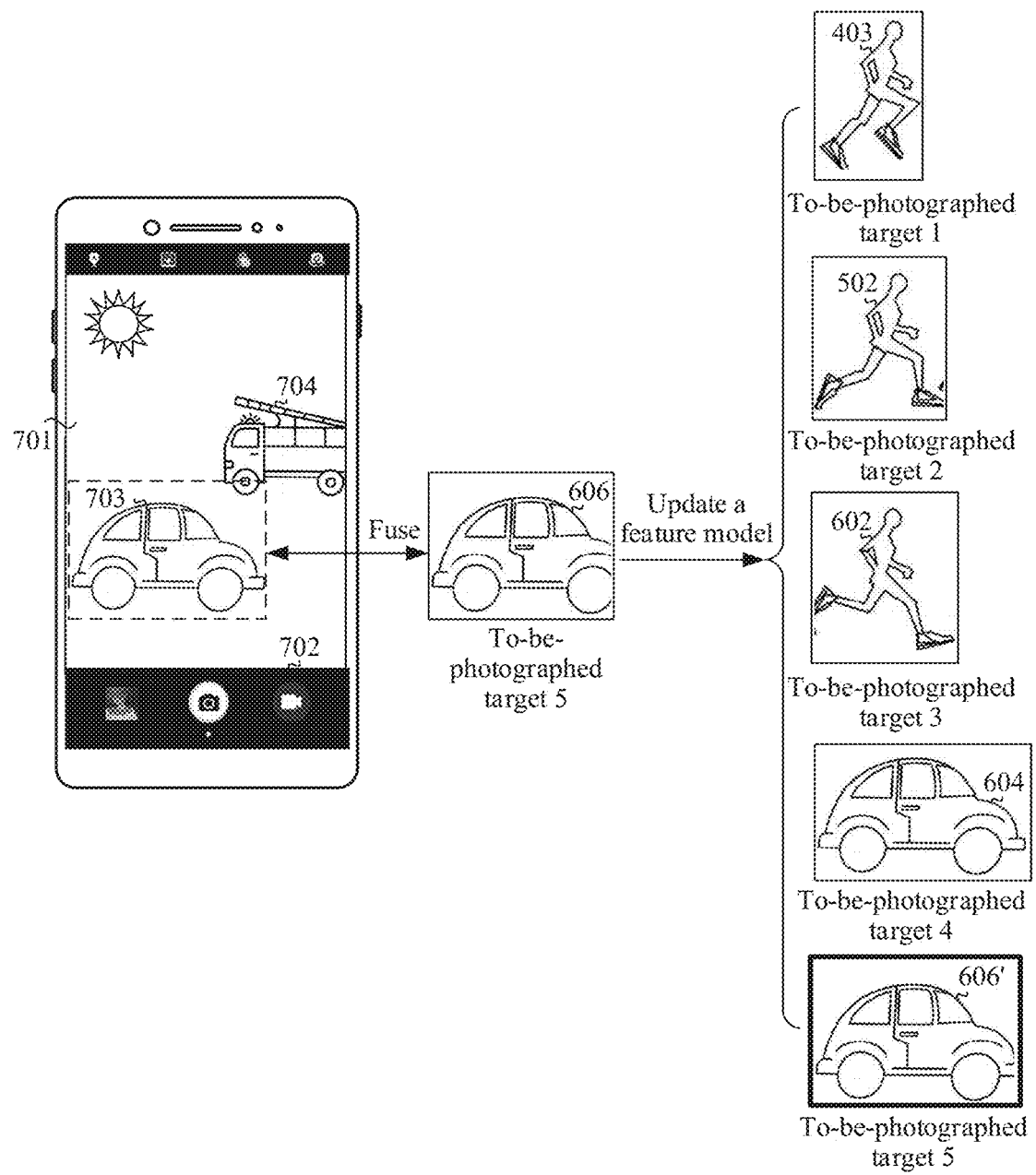
FIG. 10 is a schematic diagram 9 of an application scenario of a photographing method in accordance with one or more embodiments.

The shooting image 701 is still used as an example. The mobile phone may determine, by calculating the matching degree between the first car 703 and each to-be-photographed target in the feature model, that the first car 703 has a highest matching degree with the car 606, and a score is greater than the preset matching degree threshold. In this case, as shown in FIG. 10, the mobile phone may fuse the image feature of the first car 703 with the image feature of the car 606, to obtain an image feature of a car 606'. In this case, the car 606 in the feature model is updated to the car 606', and the car 606' can reflect a latest feature of the car when the car is used as a to-be-photographed target.

When fusing the image feature of the first car 703 and the image feature of the car 606, the mobile phone may use a fusion algorithm such as a linear weighted fusion algorithm, a cross-fusion algorithm, or a waterfall fusion algorithm. This is not limited in his application.

Figure 11:
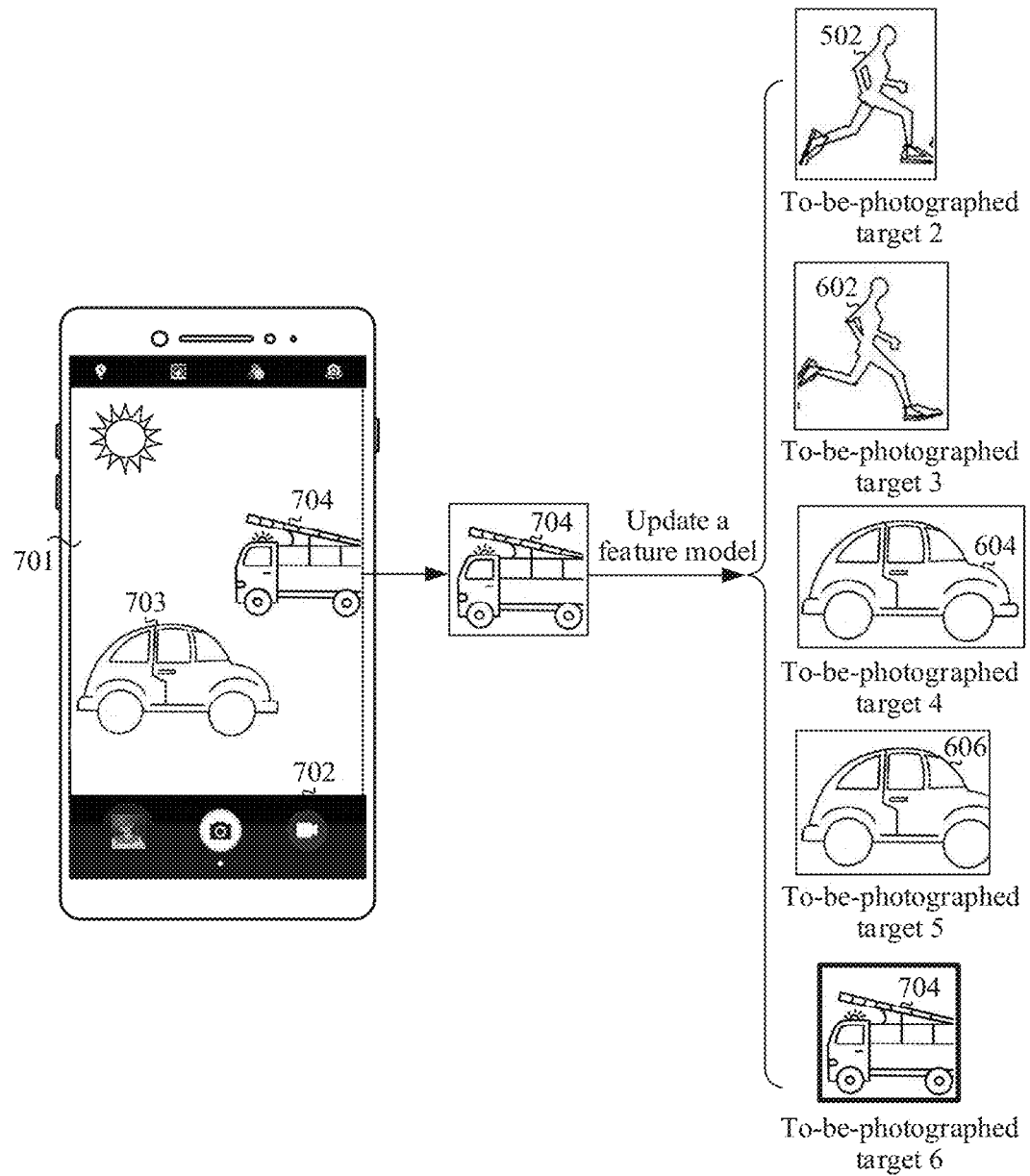
FIG. 11 is a schematic diagram 10 of an application scenario of a photographing method in accordance with one or more embodiments.

For another example, the mobile phone may determine, by calculating the matching degree between the second car 704 in the shooting image 701 and each to-be-photographed target in the feature model, that the second car 704 has a highest matching degree with the car 604, and a score is less than the preset matching degree threshold. In other words, a matching degree of a to-be-photographed target (the car 604) that most matches the second car 704 and that is in the feature model is only 50 points, and it indicates that the second car 704 may be a to-be-photographed target that newly appears in the current photographing process. As shown in FIG. 11, the mobile phone may add the image feature of the second car 704 in the shooting image 701 to the feature model, and delete an image feature of an earliest added to-be-photographed target (for example, the person 403) in the feature model. In this way, an updated feature model may continuously record image features of a plurality of to-be-photographed targets that the user pays more attention to in a recent period of time in the current photographing process.

Figure 12:
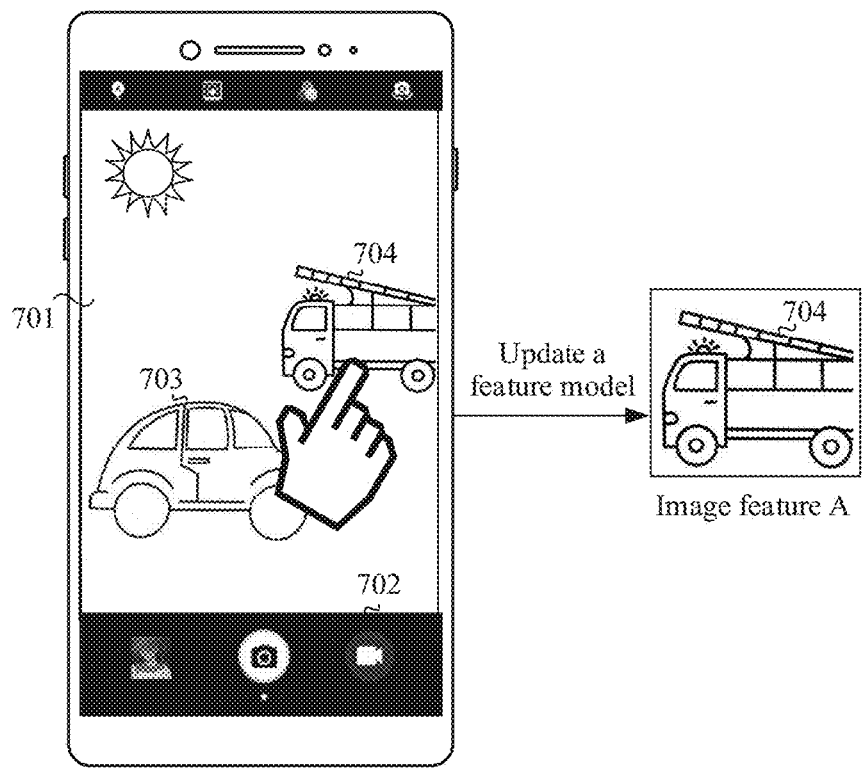
FIG. 12 is a schematic diagram 11 of an application scenario of a photographing method in accordance with one or more embodiments.

In some other embodiments, the user may further manually select the to-be-tracked target in the shooting image. As shown in FIG. 12, when the mobile phone displays the shooting image 701, the user may manually tap, in the shooting image 701, a to-be-tracked target that needs to be tracked. For example, if detecting that the user taps the second car 704 in the shooting image 701, the mobile phone may extract the image feature (for example, an image feature A) of the second car 704, and determine the second car 704 as the to-be-tracked target. In addition, the mobile phone may further clear the image features of the five to-be-photographed targets that have been stored in the feature model, and add the image feature A of the second car 704 to the feature model.

Figure 13:
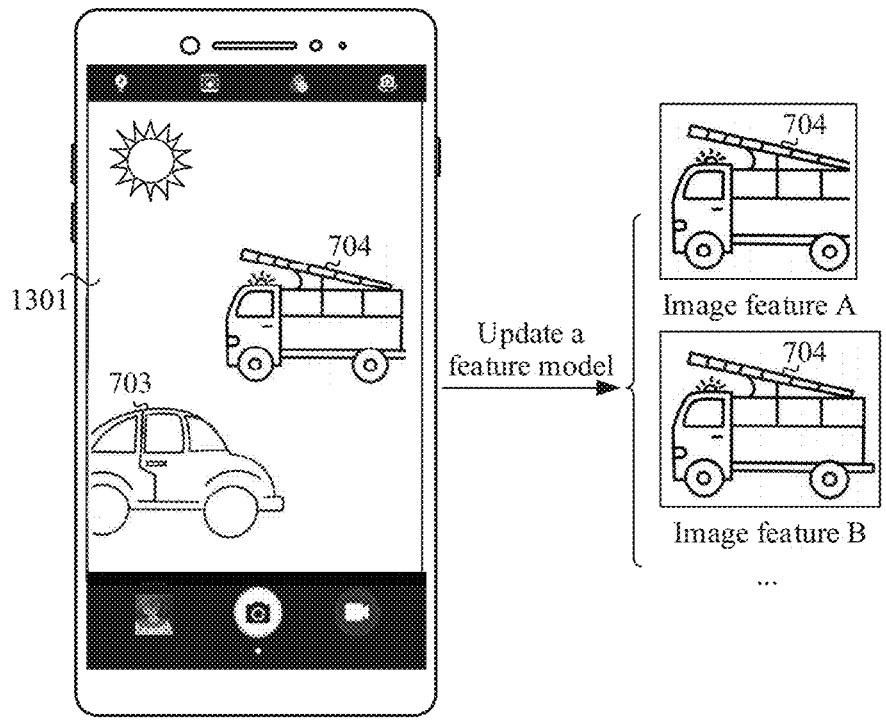
FIG. 13 is a schematic diagram 12 of an application scenario of a photographing method in accordance with one or more embodiments.

Subsequently, as shown in FIG. 13, after the mobile phone obtains a next shooting image 1301, because in this case, the image feature of the to-be-photographed target in the feature model has only one image feature A of the second car 704, the mobile phone may recognize, based on the image feature A of the second car 704, whether the shooting image 1301 includes the second car 704. If the shooting image 1301 includes the second car 704, the mobile phone may extract the image feature (for example, an image feature B) of the second car 704 in the shooting image 1301, and add the image feature B of the second car 704 to the feature model. Then, by repeating the foregoing method, the mobile phone may create, in the feature model, image features of the second car 704 in the five different shooting images. Further, the mobile phone may continue to track the second car 704 in a subsequent shooting image based on the image feature in the feature model according to the method in steps S302 to S306.

The mobile phone in steps S301 to S307 may be the mobile phone 100 shown in FIG. 1. In steps S301 to S307, related actions of the mobile phone may be performed by the processor 110 in FIG. 1 according to an instruction stored in a memory (for example, the internal memory 121 or the external memory 120).

In some examples, after the mobile phone creates the image features of the plurality of to-be-photographed targets in the feature model in the current photographing process, a to-be-tracked target determined by the mobile phone in a shooting image each time according to the foregoing method is usually one of the plurality of to-be-photographed targets. After the tracked target leaves the shooting image, because the feature model includes a plurality of to-be-photographed targets that appear in the shooting image in a recent period of time, after the tracked target returns to the shooting image, if the feature model still records an image feature of the tracked target in this case, the mobile phone may re-recognize the tracked target in the current shooting image, to continuously track a to-be-photographed target.

Figure 14:
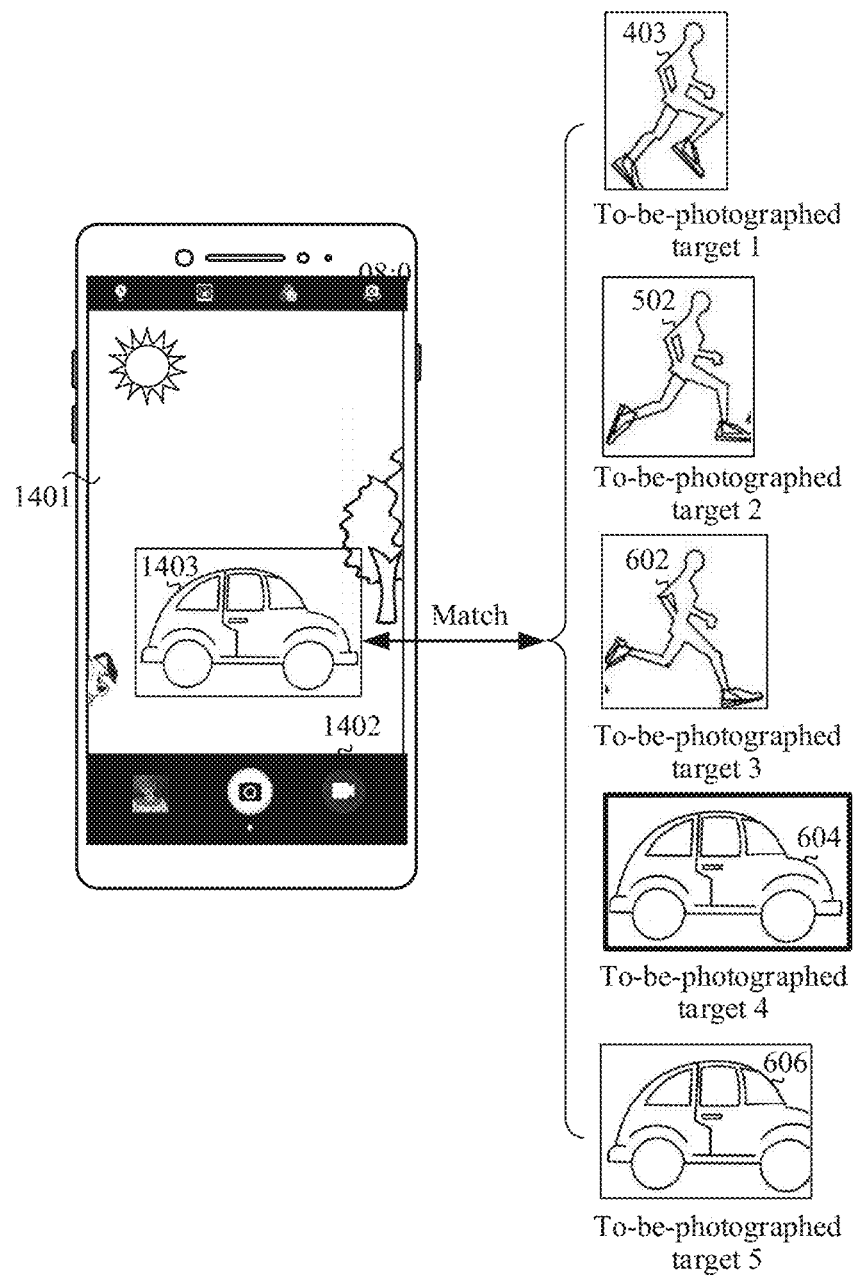
FIG. 14 is a schematic diagram 13 of an application scenario of a photographing method in accordance with one or more embodiments.

For example, as shown in FIG. 14, after opening the camera, the mobile phone may establish the feature model in the current photographing process according to the method described in step S301. Referring to related content shown in FIG. 4 to FIG. 6, the feature model separately includes the image feature of the person 403, the image feature of the person 502, the image feature of the person 602, the image feature of the car 604, and the image feature of the car 606 in a time sequence.

For example, still as shown in FIG. 14, after obtaining a first shooting image 1401 captured by the camera, the mobile phone may display the shooting image 1401 in a viewfinder window 1402. In this case, the mobile phone may determine, by using steps S303 to S305, that a matching degree between a car 1403 in the first shooting image 1401 and the car 604 in the feature model is the highest and the matching degree is greater than the matching degree threshold. In this case, the mobile phone may determine the car 1403 in the first shooting image 1401 as a to-be-tracked target, and track the car 1403 in a subsequent shooting image.

Figure 15:
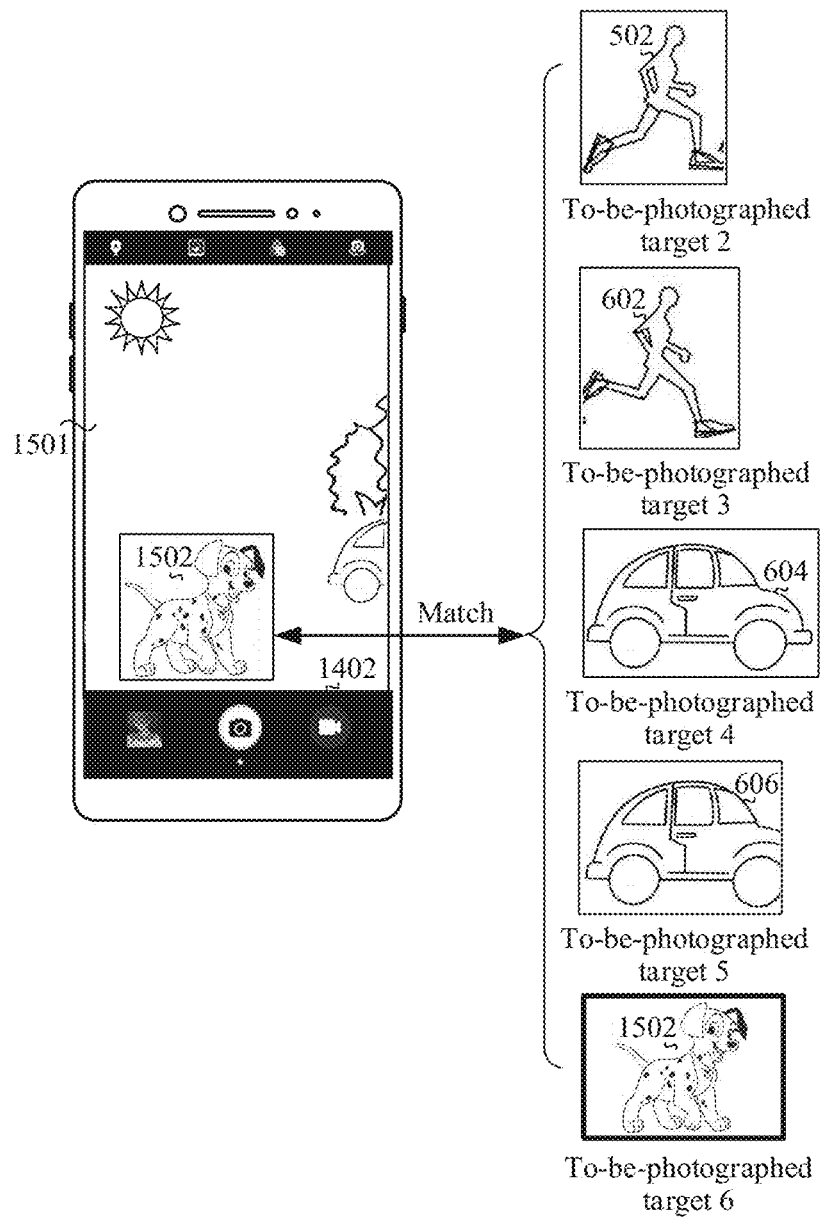
FIG. 15 is a schematic diagram 14 of an application scenario of a photographing method in accordance with one or more embodiments.

Subsequently, as shown in FIG. 15, when the mobile phone collects a second shooting image 1501, the feature model in this case may have been updated. For example, an updated feature model includes the image feature of the person 502, the image feature of the person 602, the image feature of the car 604, the image feature of the car 606, and an image feature of a dog 1502. If the mobile phone does not track the car 1403 in the second shooting image 1501, it indicates that the car 1403 has left the current shooting image (namely, the second shooting image 1501). The mobile phone may re-perform steps S302 to S305 based on the updated feature model, to determine that a to-be-tracked target in the second shooting image 1501 is the dog 1502. In this case, the tracked target of the mobile phone in the photographing process has been changed from the car 1403 to the dog 1502. In some examples, if a to-be-photographed object in the second shooting image 1501 matches none of the to-be-photographed targets in the feature model, the mobile phone may alternatively give up determining the to-be-tracked target in the second shooting image 1501.

Figure 16:
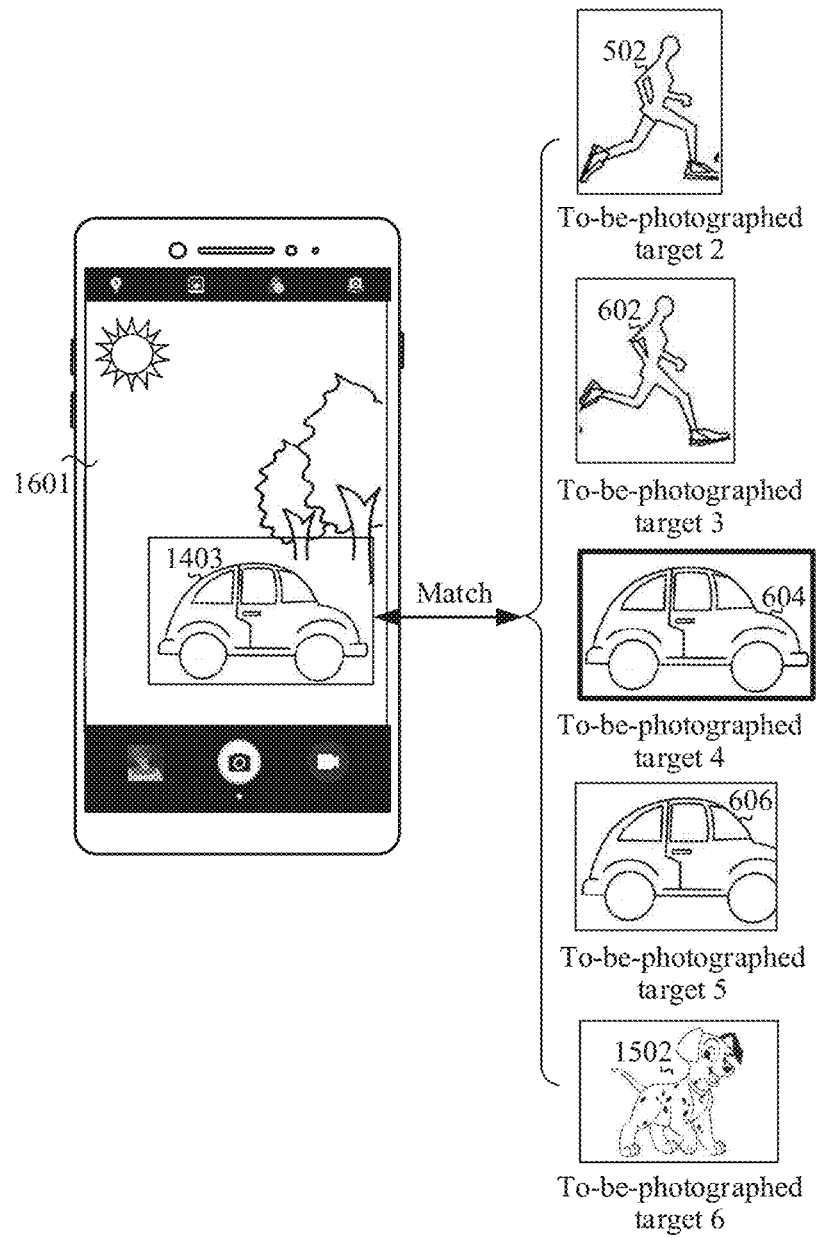
FIG. 16 is a schematic diagram 15 of an application scenario of a photographing method in accordance with one or more embodiments.

Further, as shown in FIG. 16, when the mobile phone collects a third shooting image 1601, a feature model used in this case may be the same as or different from the feature model used when the mobile phone collects the second shooting image 1501. In this case, if the car 1403 returns to the third shooting image 1601, the mobile phone may determine, by using step S303, that a to-be-photographed object in the third shooting image 1601 is the car 1403. Further, the mobile phone may calculate a matching degree between the car 1403 and each to-be-photographed target in the feature model by using step S304. In this case, the feature model still records the image feature of the car 604. Therefore, if the mobile phone learns, through calculation, that a matching degree between the car 1403 and the car 604 is the highest and the matching degree is greater than the matching degree threshold, the mobile phone may re-determine the car 1403 in the third shooting image 1601 as the to-be-tracked target for tracking.

It can be learned that the feature model created by the mobile phone records a plurality of to-be-photographed targets that appear in a shooting image in a recent period of time. In this case, after a to-be-photographed target used as a tracked target leaves a shooting image, when the to-be-photographed target returns to the shooting image again, if the feature model still records the to-be-photographed target, the mobile phone may determine the to-be-photographed target as the to-be-tracked target again. Therefore, when the user tracks and photographs an object, if the user accidentally moves the object outside a photographing range of the camera, when the user re-photographs the object in a shooting image, the mobile phone may still recognize the object in the shooting image for continuous tracking, to improve photographing experience of the user.

Further, when tracking the to-be-tracked target determined in step S305 in the shooting image, the mobile phone may further prompt, in the shooting image, the user with a detailed feature of the tracked target. For example, the mobile phone may extract a plurality of feature points of the tracked target. For example, the feature points may be used to indicate a contour of the tracked target, a location at which a motion status of the tracked target changes, or a location at which a color or a shape of the tracked target changes significantly. Further, the mobile phone may mark these feature points in the shooting image, and display the feature points to the user, so that the user can learn of a detail or a change of the tracked target in real time in the photographing process.

Figure 17A:
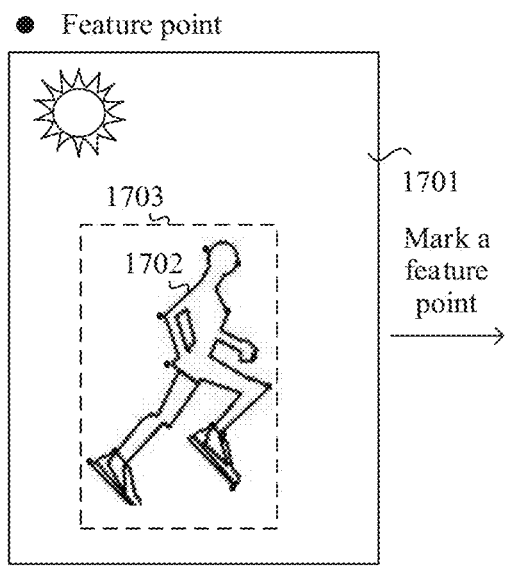
FIG. 17(a) and FIG. 17(b) are a schematic diagram 16 of an application scenario of a photographing method in accordance with one or more embodiments.
Figure 17B:
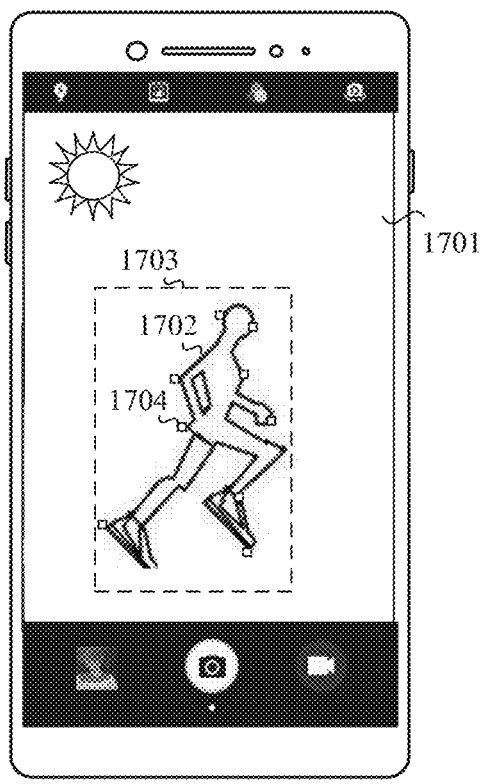

For example, as shown in FIG. 17(a), after the mobile phone determines that a to-be-tracked target in a current shooting image 1701 is a person 1702, the mobile phone may determine a placeholder frame 1703 of the person 1702. In some variations, the placeholder frame 1703 is a rectangle, and may accommodate the to-be-tracked target (for example, the person 1702). Further, the mobile phone may extract X (X>1) feature points from the placeholder frame 1703 according to a preset feature extraction algorithm. The X feature points may reflect a significant change in a shape or a location of the person 1702. As shown in FIG. 17(b), the mobile phone may mark the extracted X feature points in the shooting image 1701 by using a rectangular box 1704 (or a shape such as a circular box or a rhombus box).

The feature extraction algorithm may be a histogram of oriented gradient (HOG) extraction algorithm, a scale-invariant feature transform (SIFT) extraction algorithm, a features from accelerated segment test (FAST) extraction algorithm, a speeded up robust features (SURF) extraction algorithm, an oriented fast and rotated brief (ORB) extraction algorithm, or the like. This is not limited in this application.

For example, the mobile phone marks the feature point by using the rectangular box 1704. Because a size of the feature point extracted by the mobile phone is usually small, the mobile phone may set the rectangular box 1704 with a relatively large area to mark the feature point. For example, the mobile phone may predivide the shooting image into a plurality of rectangular blocks (for example, rectangular blocks of 300×400). In this case, the feature point extracted by the mobile phone usually falls into a rectangular block. For example, the mobile phone marks a feature point A. The mobile phone may determine, as a rectangular box corresponding to the feature point A, a rectangle including a rectangular block whose size is 2×2 and that includes the feature point A, and the mobile phone may mark the rectangular box in a manner such as highlighting.

In some embodiments, if the quantity X of feature points extracted by the mobile phone from the placeholder frame 1703 is greater than a specified value (for example, 10), the mobile phone may select 10 feature points from the X feature points for marking. For example, the mobile phone may randomly select 10 feature points from the extracted X feature points for marking. Alternatively, the mobile phone may select, from the X feature points for marking, 10 feature points whose shapes or locations change more significantly. The HOG extraction algorithm is used as an example. After the mobile phone extracts gradient values of the X feature points according to the HOG extraction algorithm, the mobile phone may select 10 feature points with largest gradient values for marking, to avoid a case in which too many feature points are marked in the shooting image, and a visual effect of viewing by the user is affected.

Likewise, if the placeholder frame 1703 of the to-be-tracked target (for example, the person 1702) determined by the mobile phone occupies a relatively small area, the visual effect of viewing by the user may also be affected if the plurality of feature points of the to-be-tracked target are still extracted for marking. Therefore, when an area occupied by the placeholder frame 1703 is less than an area threshold, the mobile phone may mark a placeholder frame (for example, the placeholder frame 1703) of the to-be-tracked target in the shooting image, and prompt the user with a currently recognized to-be-tracked object.

When tracking the to-be-tracked target (for example, the person 1702), the mobile phone may mark the feature point of the person 1702 in each shooting image according to the foregoing method. For example, after recognizing the person 1702 in a current shooting image, the mobile phone may compare the person 1702 in the current shooting image with the person 1702 in the buffered previous frame of shooting image. If determining that the person 1702 does not move, the mobile phone may continue to mark a feature point of the person 1702 in the current shooting image by using a feature point of the person 1702 in the previous frame of shooting image.

Figure 18:
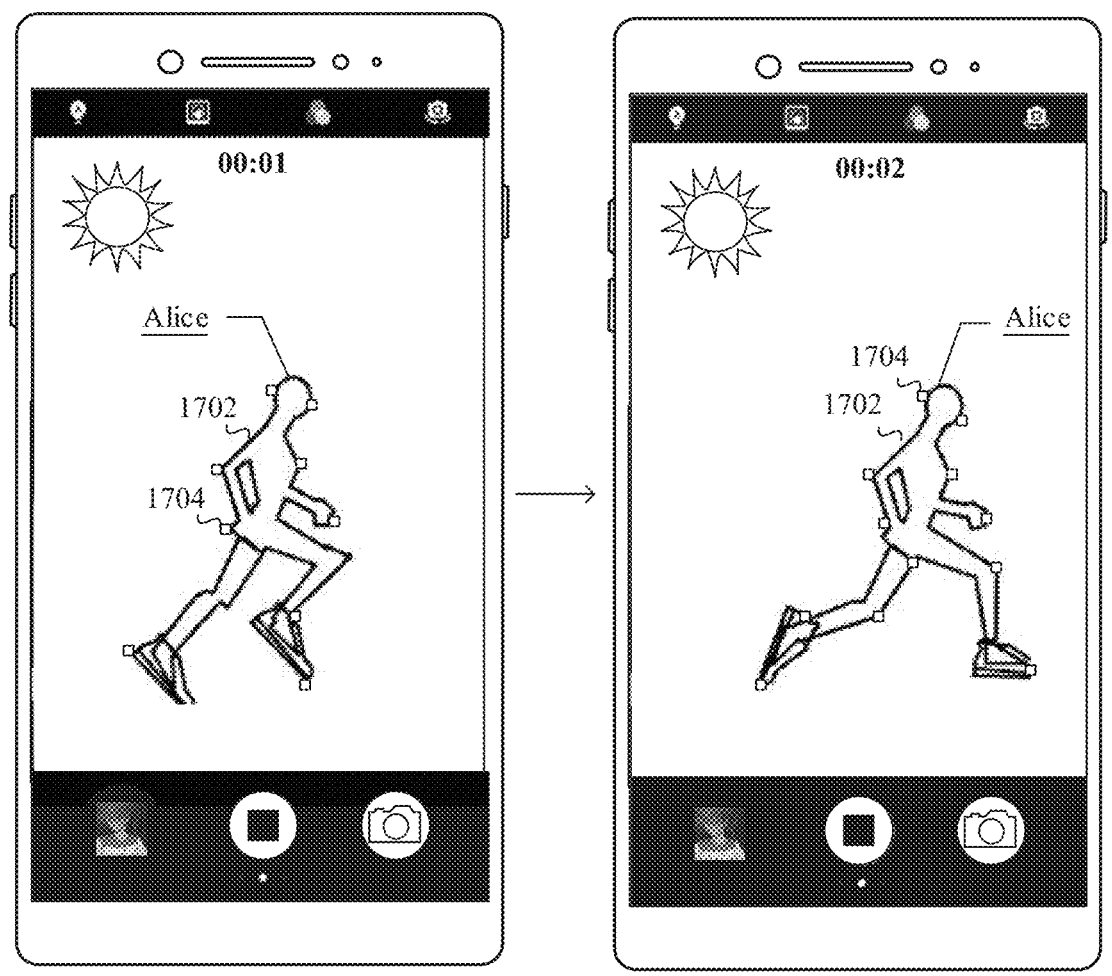
FIG. 18 is a schematic diagram 17 of an application scenario of a photographing method in accordance with one or more embodiments.

If determining that the person 1702 moves, the mobile phone may re-extract the feature point of the person 1702 from the current shooting image according to the foregoing method, and mark the extracted feature point in the current shooting image. For example, as shown in FIG. 18, the user may use a video recording function of the camera App, and open the camera to perform video recording. By using steps S301 to S305, the mobile phone may recognize the person 1702 in a shooting image as Alice, and determine the person 1702 as a to-be-tracked target. Further, when displaying each frame of shooting image, the mobile phone may mark the extracted feature point of the person 1702. These feature points depict details of a tracked target. The user may more easily and clearly observe a moving status of the tracked target by using these feature points, so that the user can focus on and take a snapshot of the tracked target, to improve photographing experience of the user.

Figure 19:
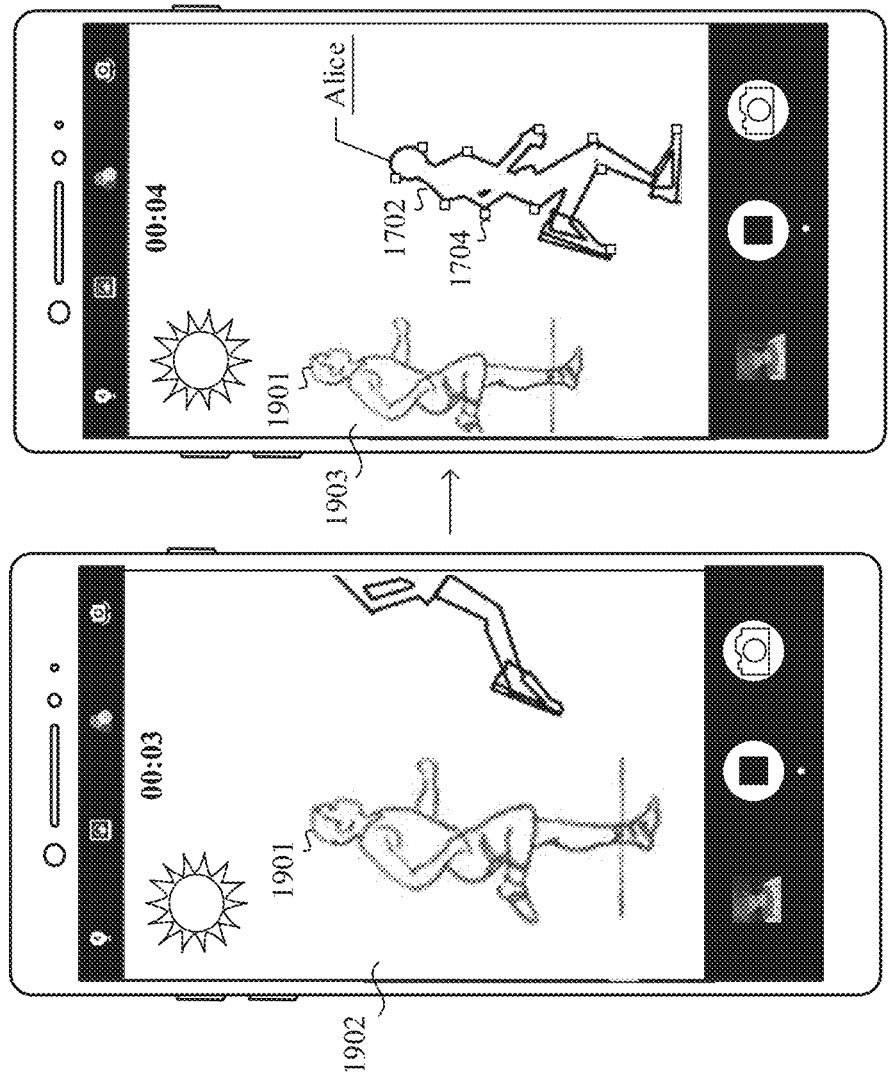
FIG. 19(a) and FIG. 19(b) are a schematic diagram 18 of an application scenario of a photographing method in accordance with one or more embodiments.

A video recording scenario shown in FIG. 18 is still used as an example. When the mobile phone continuously tracks the person 1702 in shooting images, if it is detected that no image feature in a current shooting image matches the person 1702, it indicates that Alice has left the current shooting image. As shown in FIG. 19(*a*), after the mobile phone extracts, from a shooting image 1902, no image feature that matches the person 1702, the mobile phone may re-extract a to-be-photographed object in the shooting image 1902. For example, a to-be-photographed object extracted by the mobile phone from the shooting image 1902 is a person 1901. In this case, if the feature model does not include an image feature that is of a to-be-photographed target and that matches the person 1901, the mobile phone does not determine the person 1901 as a new to-be-tracked target. In this case, the mobile phone does not need to mark a feature point of the person 1901 in the shooting image 1902. Certainly, if a matching degree between the image feature of the person 1901 and an image feature of a to-be-photographed target in the feature model is greater than a threshold, the mobile phone may determine the person 1901 as a new to-be-tracked target for tracking.

In some embodiments, after the mobile phone detects that the tracked target (for example, the person 1702) leaves a shooting image, the mobile phone may set a preset time length (for example, one second). Within the one second, the mobile phone may stop determining the new to-be-tracked target in a newly obtained shooting image. For example, within one second after the person 1702 leaves the shooting image, a focus that the user actually wants to photograph may still be the person 1702. Therefore, the mobile phone does not determine, as the new to-be-tracked target, the person 1901 that newly appears in the shooting image 1902. As shown in FIG. 19(*b*), if the mobile phone re-detects the person 1702 in a shooting image 1903 within one second, the mobile phone may continue to use the person 1702 as the to-be-tracked target, and continue to track the person 1702 in a subsequent shooting image, to continuously track a tracked target in the photographing process. Certainly, if the mobile phone does not detect, within one second, that the person 1702 returns to a shooting image, the mobile phone may re-determine, according to steps S302 to S305, a to-be-tracked target in a current shooting image for tracking.

In addition, within a preset time length (for example, one second) after the person 1702 leaves the shooting image, the mobile phone may stop updating the image feature of the to-be-photographed target in the feature model, or the mobile phone may continue to update the image features of the M to-be-photographed targets in the feature model according to the method in step S307. This is not limited in this application.

Figure 20:
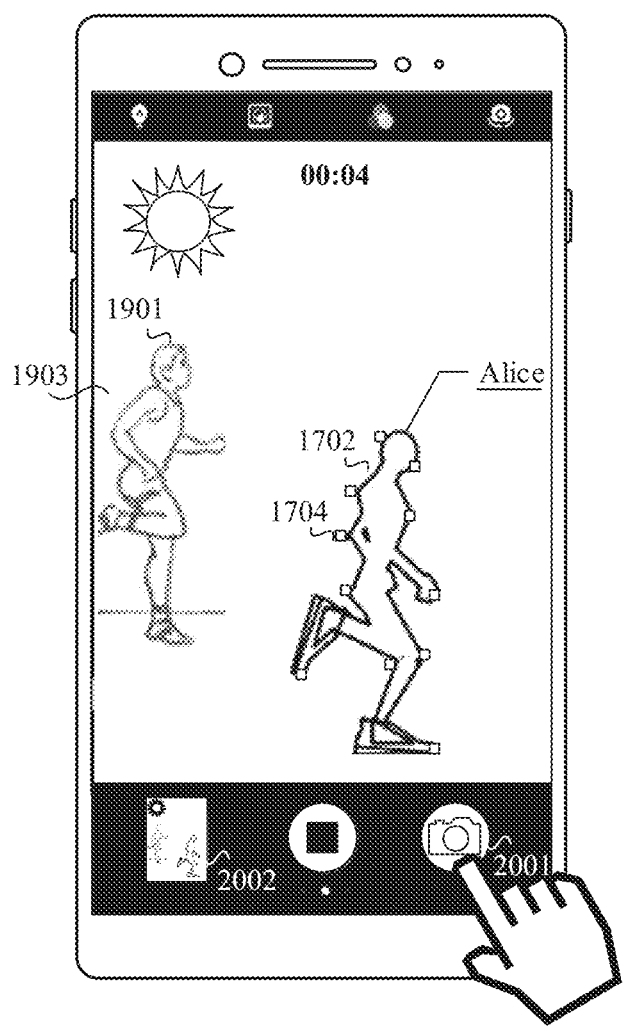
FIG. 20 is a schematic diagram 19 of an application scenario of a photographing method in accordance with one or more embodiments.

In some embodiments, the mobile phone may further provide a photographing function during video recording. As shown in FIG. 20, when the video recording function of the mobile phone is enabled, a photographing key 2001 may be further displayed. In a video recording process, the mobile phone may track the to-be-tracked target in the shooting image in real time according to the foregoing method. For example, the tracked target is the person 1702. If detecting that the user taps the photographing key 2001 in the video recording process, the mobile phone may automatically focus on and take a photo of the person 1702 that is being tracked in a current shooting image 1903. A photo thumbnail 2002 obtained through photographing may be displayed on a current screen. In this way, in the dynamic video recording process, the mobile phone may automatically focus on and photographing the tracked target in response to a photographing operation performed by the user, so that the user focuses on and captures the tracked target. Therefore, photographing experience of the user is improved.

Figure 21:
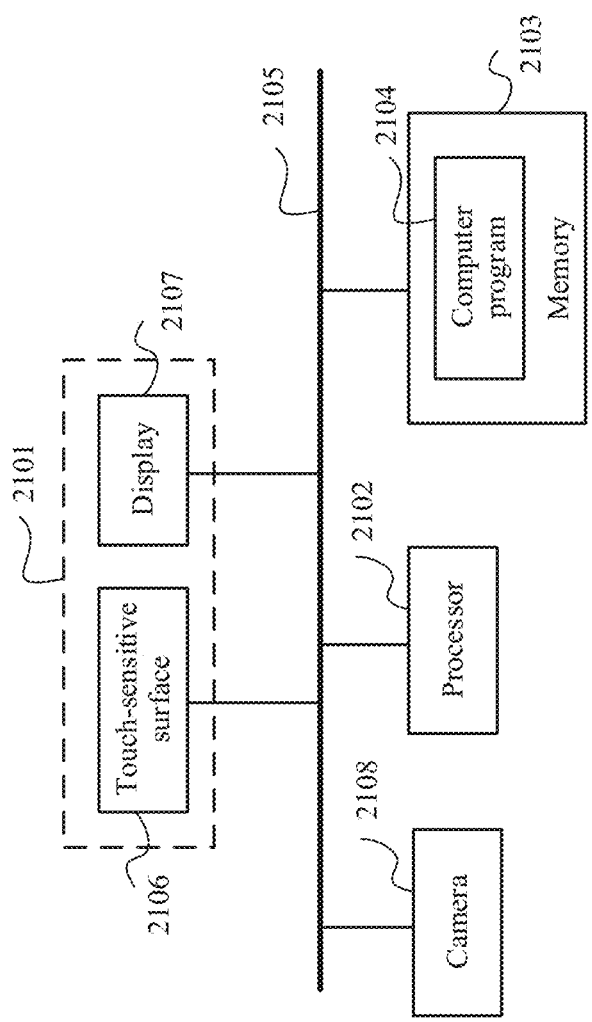
FIG. 21 is a schematic structural diagram 2 of an electronic device in accordance with one or more embodiments.

As shown in FIG. 21, an example of this application discloses an electronic device, including a touchscreen 2101, where the touchscreen 2101 includes a touch-sensitive surface 2106 and a display 2107; one or more processors 2102; a memory 2103; one or more cameras 2108; one or more applications (not shown); and one or more computer programs 2104. The foregoing components may be connected by using one or more communications buses 2105. The one or more computer programs 2104 are stored in the memory 2103 and are configured to be executed by the one or more processors 2102. The one or more computer programs 2104 include an instruction, and the instruction may be used to perform the photographing method in the foregoing embodiments.

By using the foregoing descriptions about the implementations, a person skilled in the art may understand that, for the purpose of convenient and brief description, division into the foregoing function modules is taken as an example for illustration. In actual application, the foregoing functions may be allocated to different modules for implementation based on a requirement. For example, an inner structure of an apparatus is divided into different function modules to implement all or some functions described above. For a detailed working process of the foregoing system, apparatus, and unit, refer to a corresponding process in the foregoing method embodiment. Details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, technical solutions of this application may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random-access memory, a magnetic disk, or a compact disc.

The foregoing descriptions are merely exemplary implementations of the embodiments of this application, but are not intended to limit the protection scope of this application. Any variation or replacement within the technical scope disclosed in the embodiments of this application shall fall within the protection scope of this application. Therefore, the protection scope of this application shall be subject to the protection scope of the claims.

What is claimed is:

1. A photographing method, comprising:
   generating a feature model comprising a plurality of to-be-photographed targets based on to-be-photographed objects comprised in a plurality of shooting images, wherein the to-be-photographed targets associate with a plurality of image features and the plurality of shooting images are obtained before a first shooting image;
   obtaining the first shooting image comprising one or more to-be-photographed objects;
   determining a to-be-photographed object in the first shooting image as a to-be-tracked target in response to the to-be-photographed object matching a to-be-photographed target in the feature model; and
   tracking the to-be-tracked target in a number of shooting images following the first shooting image;
   wherein for each of shooting images following the first shooting image, the tracking of the to-be-tracked target is active when the shooting image comprises a to-be-photographed object matching the to-be-tracked target, and the tracking of the to-be tracked target is inactive when the shooting image does not comprise a to-be-photographed object matching the to-be-tracked target;
   wherein tracking the to-be-tracked target in the number of shooting images following the first shooting image further comprises:
      initiating a timer in response to the tracking of the to-be-tracked target being active in a previous shooting image and the tracking of the to-be-tracked target being inactive in a current shooting image;
      obtaining a next shooting image;
      in response to the timer indicating a time interval less than a preset time length, determining one or more to-be-photographed objects in the next shooting image, and terminating the timer when a to-be-photographed object in the next shooting image matches the to-be-tracked target, and
      in response to the timer indicating a time interval greater than or equal to the preset time length, determining a next to-be-tracked target in the next shooting image and terminating the timer.

2. The method of claim 1, wherein generating the feature model further comprises:
   obtaining a shooting image;
   extracting a to-be-photographed object in the shooting image;
   determining the to-be-photographed object being a to-be-photographed target according to a recognition algorithm;
   determining an image feature associated with the to-be-photographed target;
   adding the to-be-photographed target with the associated image feature to the feature model;
   obtaining a next shooting image; and
   adding a next to-be-photographed target with an associated image feature to the feature model.

3. The method of claim 2, wherein the feature model is generated based on a preset number of shooting images before the first shooting image, and the plurality of to-be-photographed targets are determined based on the preset number of shooting images before the first shooting image.

4. The method of claim 2, wherein the number of to-be-photographed targets in the feature model is less than or equal to a preset threshold.

5. The method of claim 4, wherein generating the feature model further comprises:
   determining a to-be-photographed target with an associated image feature to be added to the feature model;
   deleting an earliest added to-be-photographed target with an associated image feature in response to the number of to-be-photographed targets stored in the feature model equal to the preset threshold; and
   adding the new to-be-photographed target with the associated image feature to the feature model.

6. The method of claim 1,
   wherein generating the feature model further comprising:
      deleting the to-be-photographed targets with the associated image features stored in the feature model in response to a user selection of a to-be-photographed object in a shooting image;
      determining an image feature associated with the to-be-photographed object selected by the user; and
      adding the to-be-photographed object selected by the user to the feature model as a to-be-photographed target, the to-be-photographed target associated with the image feature determined for the to-be-photographed object selected by the user; and
   wherein the one or more to-be-photographed objects comprised in the first shooting image are compared with the to-be-photographed target in the feature model.

7. The method of claim 1, further comprising:
   updating, in the feature model, an image feature of the to-be-photographed target matching the to-be-tracked target based on an image feature of the to-be-tracked target in the first shooting image;
   wherein the tracking of the to-be-tracked target in the number of shooting images following the first shooting image is based on the updated image feature of the to-be-photographed target in the feature model.

8. The method of claim 1, wherein determining the to-be-tracked target further comprises:
   determining a matching degree for each to-be-photographed object comprised in the first shooting image and each of the to-be-photographed targets in the feature model;
   determining a to-be-photographed object having a highest matching degree with a to-be-photographed target in the feature model and the matching degree being greater or equal to a threshold; and
   determining the to-be-photographed object having the highest matching degree that is greater than a threshold as the to-be-tracked target.

9. The method of claim 1, wherein the number of the shooting images following the first shooting image for tracking the to-be-tracked target is determined based on a preset tracking period, and the method further comprises:
   after completion of the preset tracking period for the to-be-tracked target, obtaining a second shooting image comprising one or more to-be-photographed objects;
   determining a to-be-photographed object in the second shooting image as a next to-be-tracked target in response to the to-be-photographed object matching a to-be-photographed target in the feature model; and
   tracking the next to-be-tracked target in a number of shooting images following the second shooting image.

10. The method of claim 1, wherein determining the to-be-tracked target further comprises:
    generating a placeholder frame for the to-be-tracked target in the first shooting image, the placeholder frame accommodating the to-be-tracked target in the first shooting image; and
    determining a plurality of feature points for the to-be-tracked target in the placeholder frame.

11. The method of claim 1, wherein tracking the to-be-tracked target in the number of shooting images following the first shooting image further comprises:
    in each shooting image of the number of shooting images following the first shooting image, determining a plurality of feature points for the to-be-tracked target in the shooting image in response to the tracking of the to-be-tracked target being active in the shooting image.

12. An electronic device, comprising:
    one or more processors; and
    a non-transitory computer-readable medium, having computer-executable instructions stored thereon, the computer-executable instructions, when executed by one or more processors, causing the one or more processors to facilitate:
    generating a feature model comprising a plurality of to-be-photographed targets based on to-be-photographed objects comprised in a plurality of shooting images, wherein the to-be-photographed targets associate with a plurality of image features and the plurality of shooting images are obtained before a first shooting image;
    obtaining the first shooting image comprising one or more to-be-photographed objects;
    determining a to-be-photographed object in the first shooting image as a to-be-tracked target in response to the to-be-photographed object matching a to-be-photographed target in the feature model; and
    tracking the to-be-tracked target in a number of shooting images following the first shooting image;
    wherein for each of shooting images following the first shooting image, the tracking of the to-be-tracked target is active when the shooting image comprises a to-be-photographed object matching the to-be-tracked target, and the tracking of the to-be tracked target is inactive when the shooting image does not comprise a to-be-photographed object matching the to-be-tracked target; and
    wherein tracking the to-be-tracked target in the number of shooting images following the first shooting image further comprises:
        initiating a timer in response to the tracking of the to-be-tracked target being active in a previous shooting image and the tracking of the to-be-tracked target being inactive in a current shooting image;
        obtaining a next shooting image;
        in response to the timer indicating a time interval less than a preset time length, determining one or more to-be-photographed objects in the next shooting image, and terminating the timer when a to-be-photographed object in the next shooting image matches the to-be-tracked target, and
        in response to the timer indicating a time interval greater than or equal to the preset time length, determining a next to-be-tracked target in the next shooting image and terminating the timer.

13. The device of claim 12, wherein generating the feature model further comprises:
  obtaining a shooting image;
  extracting a to-be-photographed object in the shooting image;
  determining the to-be-photographed object being a to-be-photographed target according to a recognition algorithm;
  determining an image feature associated with the to-be-photographed target;
  adding the to-be-photographed target with the associated image feature to the feature model;
  obtaining a next shooting image; and
  adding a next to-be-photographed target with an associated image feature to the feature model.

14. The device of claim 13, wherein the feature model is generated based on a preset number of shooting images before the first shooting image, and the plurality of to-be-photographed targets are determined based on the preset number of shooting images before the first shooting image.

15. The device of claim 13, wherein the number of to-be-photographed targets in the feature model is less than or equal to a preset threshold.

16. The device of claim 15, wherein generating the feature model further comprises:
  determining a to-be-photographed target with an associated image feature to be added to the feature model;
  deleting an earliest added to-be-photographed target with an associated image feature in response to the number of to-be-photographed targets stored in the feature model equal to the preset threshold; and
  adding the new to-be-photographed target with the associated image feature to the feature model.

17. The device of claim 12,
  wherein generating the feature model further comprising:
    deleting the to-be-photographed targets with the associated image features stored in the feature model in response to a user selection of a to-be-photographed object in a shooting image;
    determining an image feature associated with the to-be-photographed object selected by the user; and
    adding the to-be-photographed object selected by the user to the feature model as a to-be-photographed target, the to-be-photographed target associated with the image feature determined for the to-be-photographed object selected by the user; and
  wherein the one or more to-be-photographed objects comprised in the first shooting image are compared with the to-be-photographed target in the feature model.

18. The device of claim 12, wherein the computer-executable instructions, when executed by the one or more processors, causing the one or more processors to further facilitate:
  updating, in the feature model, an image feature of the to-be-photographed target matching the to-be-tracked target based on an image feature of the to-be-tracked target in the first shooting image;
  wherein the tracking of the to-be-tracked target in the number of shooting images following the first shooting image is based on the updated image feature of the to-be-photographed target in the feature model.

19. The method of claim 12, wherein determining the to-be-tracked target further comprises:
  determining a matching degree for each to-be-photographed object comprised in the first shooting image and each of the to-be-photographed targets in the feature model;
  determining a to-be-photographed object having a highest matching degree with a to-be-photographed target in the feature model and the matching degree being greater or equal to a threshold; and
  determining the to-be-photographed object having the highest matching degree that is greater than a threshold as the to-be-tracked target.

20. The method of claim 12, wherein the number of the shooting images following the first shooting image for tracking the to-be-tracked target is determined based on a preset tracking period, and wherein the computer-executable instructions, when executed by one or more processors, causing the one or more processors to further facilitate:
  after completion of the preset tracking period for the to-be-tracked target, obtaining a second shooting image comprising one or more to-be-photographed objects;
  determining a to-be-photographed object in the second shooting image as a next to-be-tracked target in response to the to-be-photographed object matching a to-be-photographed target in the feature model; and
  tracking the next to-be-tracked target in a number of shooting images following the second shooting image.

* * * * *